(12) United States Patent
Shukla

(10) Patent No.: US 7,848,057 B1
(45) Date of Patent: Dec. 7, 2010

(54) DISK DRIVE WITH AIR-ACTUATED LOAD/UNLOAD RAMP

(75) Inventor: Dinesh Shukla, Rutland, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 810 days.

(21) Appl. No.: 11/672,383

(22) Filed: Feb. 7, 2007

Related U.S. Application Data

(60) Provisional application No. 60/771,977, filed on Feb. 10, 2006.

(51) Int. Cl.
*G11B 5/54* (2006.01)

(52) U.S. Cl. .................................................. 360/254.3

(58) Field of Classification Search .............. 360/254.3, 360/254.4, 254.5, 254.7, 254.8, 254.9
See application file for complete search history.

(56) References Cited

U.S. PATENT DOCUMENTS

| | | | | |
|---|---|---|---|---|
| 4,703,376 A | | 10/1987 | Edwards et al. | |
| 5,274,519 A | * | 12/1993 | Saito et al. ................ | 360/254.3 |
| 5,764,437 A | * | 6/1998 | Meyer et al. .............. | 360/254.3 |
| 6,115,214 A | * | 9/2000 | Allsup et al. .............. | 360/254.3 |
| 6,473,268 B2 | | 10/2002 | Simozato | |
| 6,480,361 B1 | * | 11/2002 | Patterson .................. | 360/254.3 |
| 6,570,741 B2 | * | 5/2003 | Yamanouchi ............. | 360/254.4 |
| 6,583,963 B2 | * | 6/2003 | Boutaghou ................ | 360/254.7 |

* cited by examiner

*Primary Examiner*—Angel A. Castro
(74) *Attorney, Agent, or Firm*—H. Sanders Gwin, Jr.

(57) ABSTRACT

Various air-actuated components of a disk drive are disclosed. For instance, an air-actuated load/unload ramp may be used by a disk drive and which is movable between a parked position and an operational position. An air-actuated ramp lock may be used by a disk drive to lock a movable load/unload ramp (e.g., one that may move between a parked position and an operational position). Finally, an air-actuated head positioner assembly may be used by a disk drive to lock a head positioner assembly in its parked position. In each of these cases, air currents generated by a rotation of one or more disks used by the disk drive provide the motive force for moving the noted air-actuated component at least generally from one position to another.

18 Claims, 13 Drawing Sheets

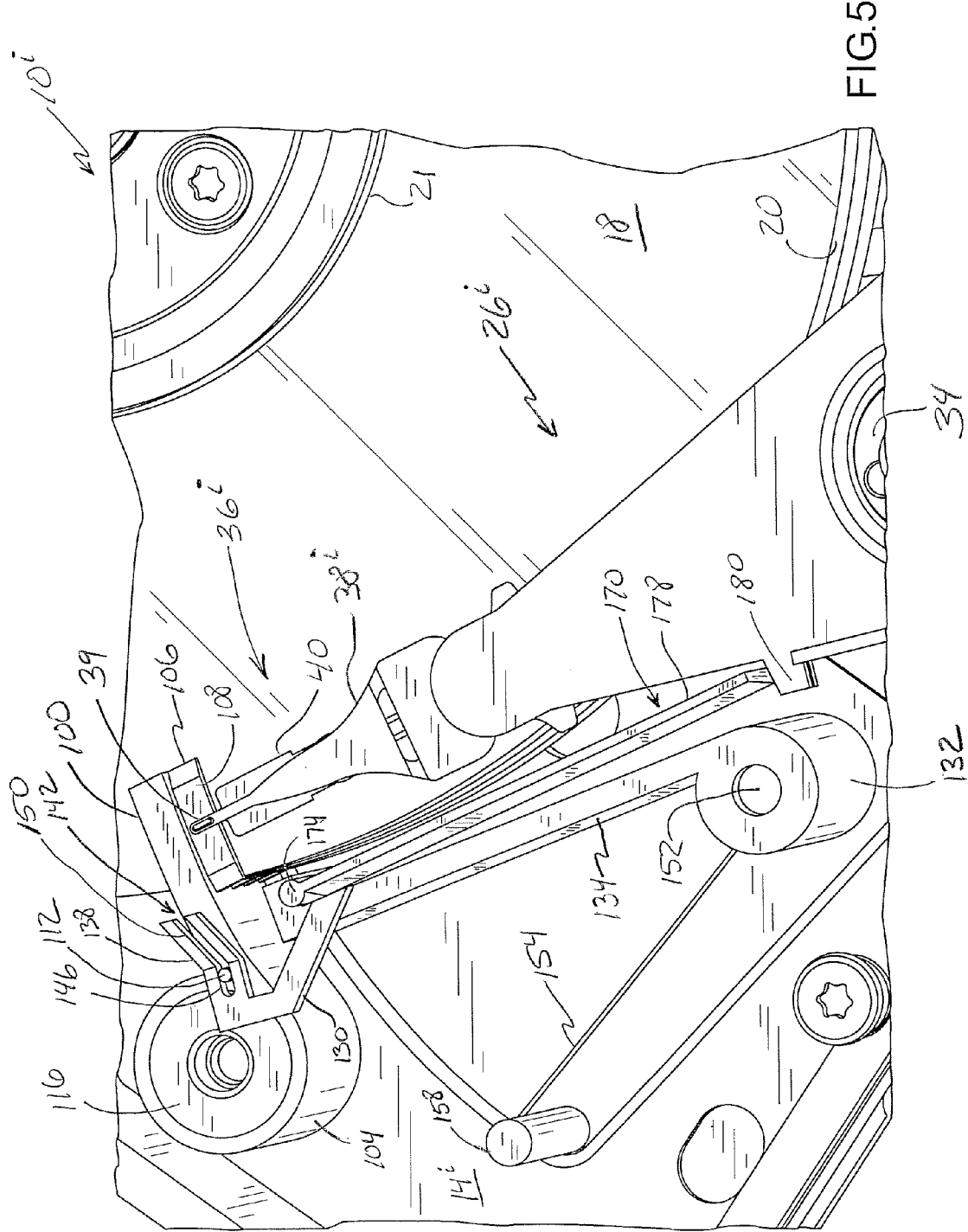

DISK DRIVE WITH AIR-ACTUATED LOAD/UNLOAD RAMP

CROSS-REFERENCE TO RELATED APPLICATIONS

This patent application claims priority under 35 U.S.C. §119(e) to U.S. Provisional Patent Application Ser. No. 60/771,977, that was filed on Feb. 10, 2006, that is entitled "DISK DRIVE DYNAMIC RAMP HEAD PARKING AND AIR FLAP ACTUATOR LOCKING MECHANISM," and the entire disclosure of which is hereby incorporated by reference in its entirety herein.

FIELD OF THE INVENTION

The present invention is generally directed to disk drives and, more particularly, to load/unload type disk drives.

BACKGROUND OF THE INVENTION

There are two general ways in which disk drive operations are terminated in relation to the position of each slider used by the disk drive. One disk drive configuration is commonly referred to as a dynamic load/unload type. In this case, the head stack or head positioner assembly may be moved to a "parked position" at the termination of disk drive operations to dispose each slider at an outer portion of its corresponding data storage disk, but in any case in vertically spaced relation to its corresponding disk. In this regard, the disk drive includes a load/unload ramp that may be disposed at an outer portion of each data storage disk. Movement of the head positioner assembly onto the load/unload ramp typically both moves each slider vertically away from its corresponding data storage disk and also exerts somewhat of a retaining force on the head positioner assembly. This position of the load/unload ramp reduces the storage capacity of each data storage disk—an outer annular portion is not available for data storage due to the presence of the load/unload ramp.

Another disk drive configuration is commonly referred to as a contact start/stop type, where the head positioner assembly typically moves in a direction to dispose each slider used by the drive toward an inner, non-data storage region of the corresponding data storage disk. Terminating the rotation of the data storage disk(s) in this type of disk drive configuration results in each slider actually establishing contact with or "landing" on its corresponding data storage disk, and the slider remains on this disk until disk drive operations are re-initiated at a later time. There are a number of disadvantages with this configuration. One is that typically the slider landing zone of a data storage disk is not available for data storage purposes. The read/write head of a slider, its corresponding disk, or both may be damaged by the contact between each slider and its corresponding disk. Finally, what is commonly referred to in the art as "stiction" may develop between the slider and its corresponding disk at some point in time after disk drive operations have been terminated and prior to being re-initiated. That is, a slider may become stuck on its corresponding disk. This may result in failure of the disk drive.

SUMMARY OF THE INVENTION

A first aspect of the present invention is generally embodied by a disk drive having an air-actuated load/unload ramp. Air currents from rotation of one or more data storage disks used by the disk drive generate a force that moves the load/unload ramp from a parked position to an operational position. When the load/unload ramp is in its parked position, a head positioner assembly of the disk drive is parked on the load/unload ramp. The load/unload ramp is in its operational position for normal disk drive operations.

With further regard to the first aspect, the air currents generated by the rotation of one or more data storage disks of the disk drive may act directly on the load/unload ramp to move the same from its parked position to its operational position. Another option is for the air currents generated by the rotation of one or more data storage disks of the disk drive to act on another appropriate structure to move the same, where this movement is translated to the load/unload ramp to move the same from its parked position to its operational position. Other characterizations may be made in relation to the first aspect and include without limitation: 1) the load/unload ramp may move in any appropriate manner between its parked and operational positions, such as by a pivotal or pivotal-like motion about a certain axis; 2) the load/unload ramp may be biased toward its parked position in any appropriate manner; 3) the parked position and the operational position each may encompass a single position or any position within a positional range; and 4) at least a portion of each of the ramp sections used by the load/unload ramp may be aligned with a portion of each of the data storage disks used by the disk drive in a dimension corresponding with the rotational axis of each such disk, all at a time when the load/unload ramp is in each of its parked and operational positions.

A second aspect of the present invention is generally embodied by a disk drive having an air-actuated ramp lock for a load/unload ramp. The load/unload ramp is movable between a parked position and an operational position. A head positioner assembly of the disk drive may be parked on the load/unload ramp when the load/unload ramp is in its parked position. Air currents from rotation of one or more data storage disks used by the disk drive generate a force that moves the ramp lock to unlock the same from the load/unload ramp, which in turn allows the load/unload ramp to move from its parked position to its operational position. The load/unload ramp is in its operational position for normal disk drive operations.

With further regard to the second aspect, the load/unload ramp may move from its parked position to its operational position in any appropriate manner and including without limitation in accordance with the first aspect. The ramp lock may be of any appropriate configuration to provide the desired locking function for the movable load/unload ramp, and may be biased toward its locking or locked position in any appropriate manner. In one embodiment, the ramp lock is configured to disengage or unlock the load/unload ramp only after the head positioner assembly has been moved off of or unloaded from the load/unload ramp.

A third aspect of the present invention is generally embodied by a disk drive having an air-actuated head stack or head positioner assembly lock. The head positioner assembly may be parked on a load/unload ramp, although such may not be required in all instances. Air currents from rotation of one or more data storage disks used by the disk drive generate a force that moves the head positioner assembly lock to unlock the same from the head positioner assembly, which in turn allows the head positioner assembly to move into position for undertaking normal disk drive operations.

With further regard to the third aspect, the head positioner assembly lock may move in any appropriate manner to disengage/unlock the head positioner assembly. Moreover, the head positioner assembly lock may move in any appropriate manner to engage/lock the head positioner assembly. In one embodiment, the head positioner assembly lock is biased toward its engaged or locking position with the head positioner assembly. Preferably the head positioner assembly lock does not lock the position of the head positioner assembly until after the head positioner assembly has reached its parked position (e.g., parked on a load/unload ramp).

In the case of each of the first through the third aspects of the present invention: 1) the disk drive may include any appropriate number of data storage disks; 2) any referenced load/unload ramp may accommodate the parking of any appropriate number of head-gimbal assemblies of the head positioner assembly; and 3) the head positioner assembly may be of any appropriate configuration, for instance including one or more actuator arms, an E-block or the like, and one or more head-gimbal assemblies. It should also be appreciated that the first, second, and third aspects may be used individually or in any combination.

BRIEF DESCRIPTION OF THE DRAWINGS

FIG. 5 is a perspective view of one embodiment of an air-actuated load/unload ramp, along with one embodiment of an air-actuated head positioner assembly lock.

DETAILED DESCRIPTION

Figure 1:
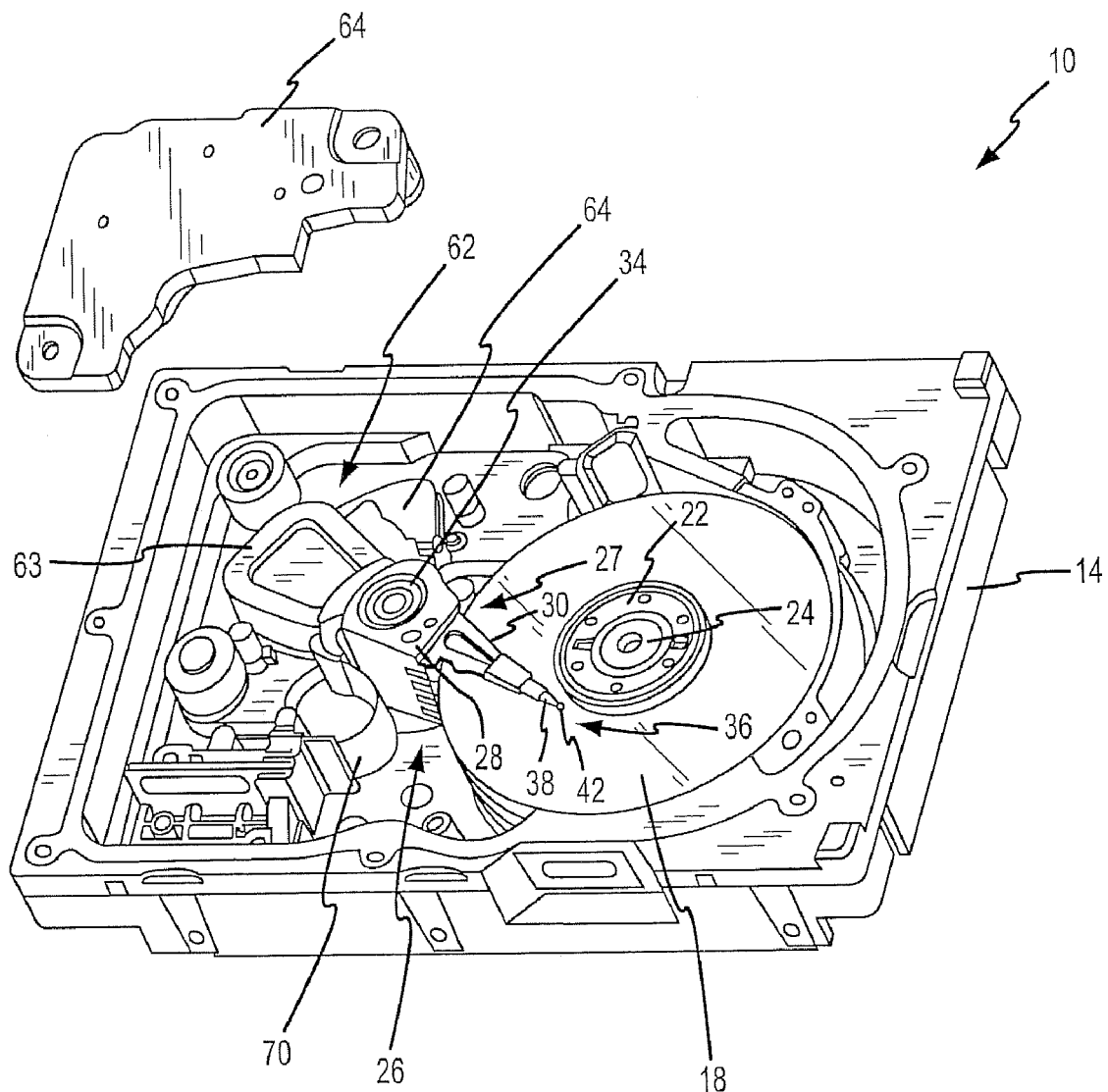
FIG. 1 is a perspective view of a prior art disk drive that may be adapted to incorporate an air-actuated load/unload ramp, an air-actuated load/unload ramp lock, and/or an air-actuated head positioner assembly lock.
Figure 2:
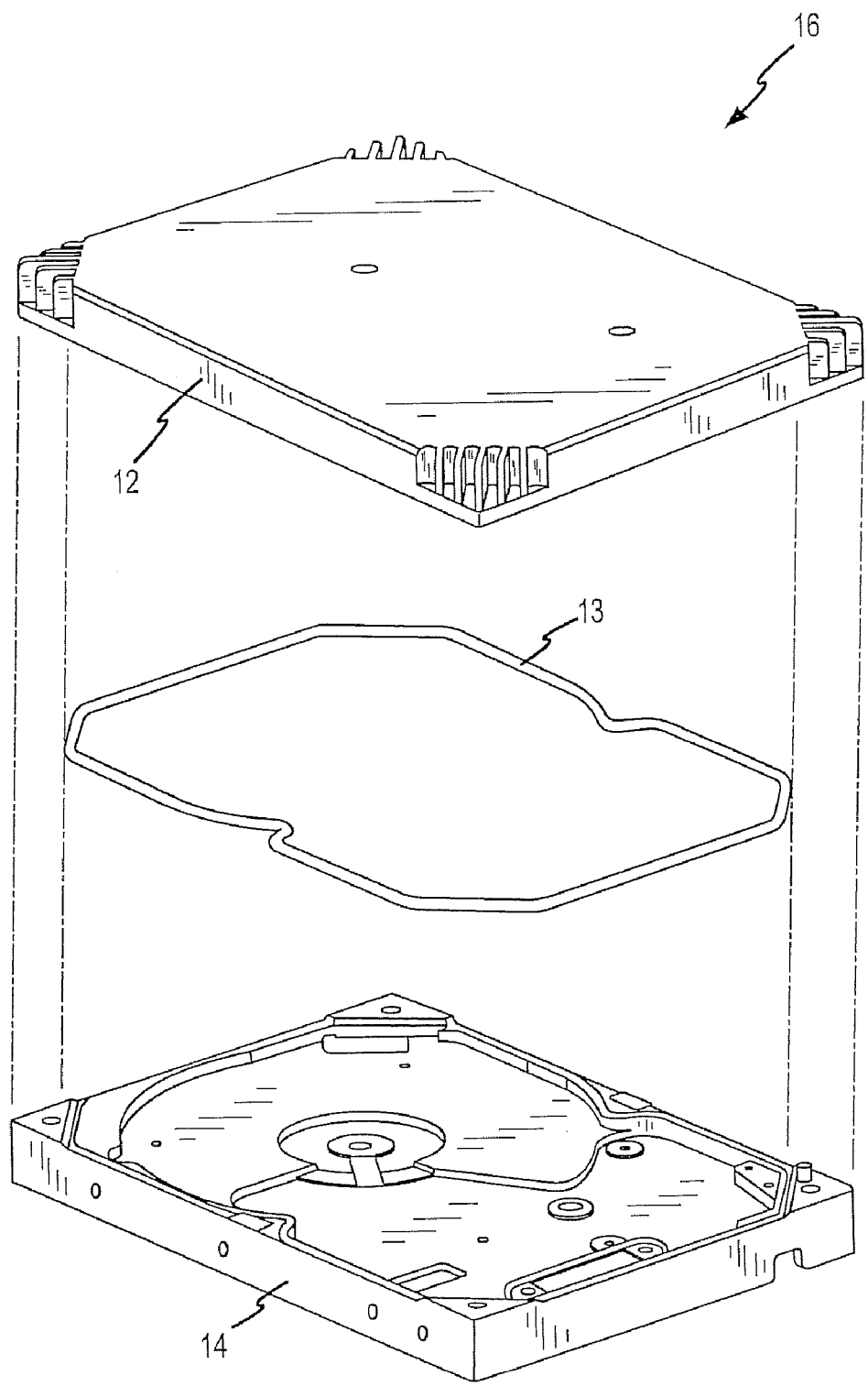
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a dynamic ramp for head parking and/or an air flap actuator locking mechanism, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM magnet assembly") 64 that is disposed above and below this coil 63 (the upper VCM magnet assembly 64 being "exploded away" in FIG. 1). The VCM magnet assemblies 64 will typically be mounted on the housing 16 in a fixed position, with the upper VCM magnet assembly 64 being appropriately supported above the lower VCM magnet assembly 64. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
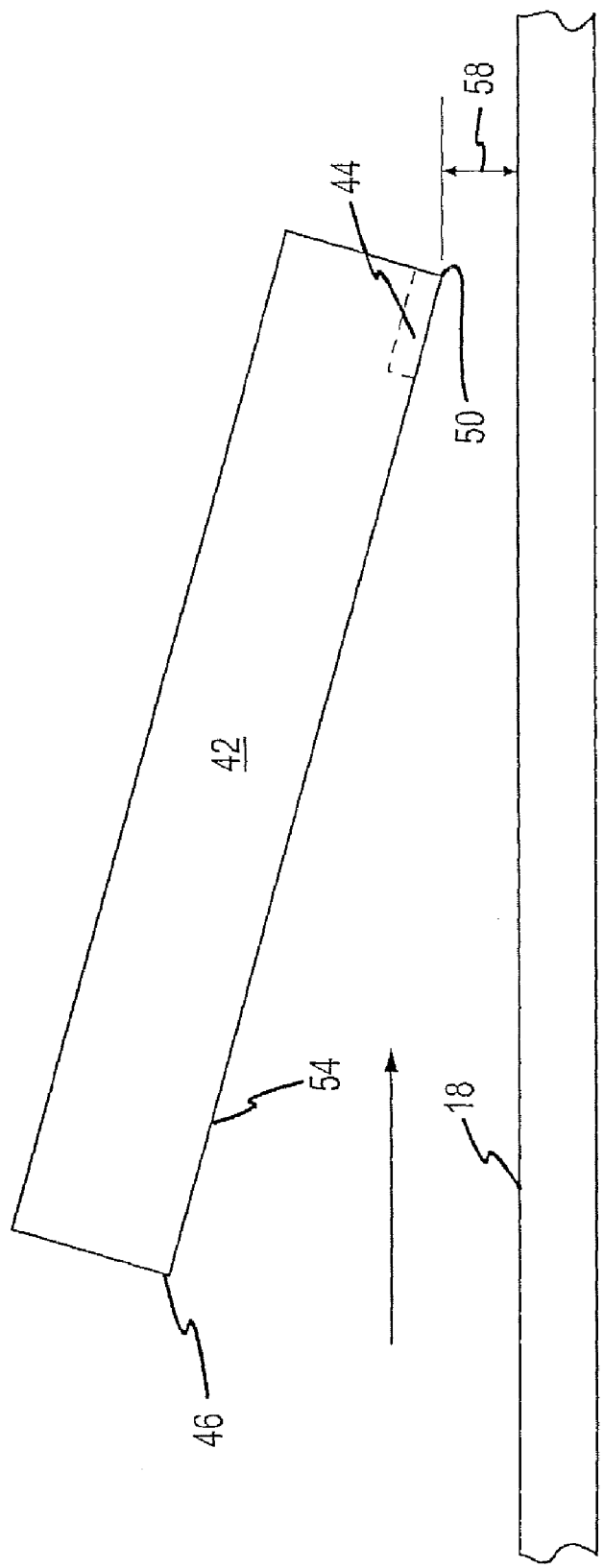
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
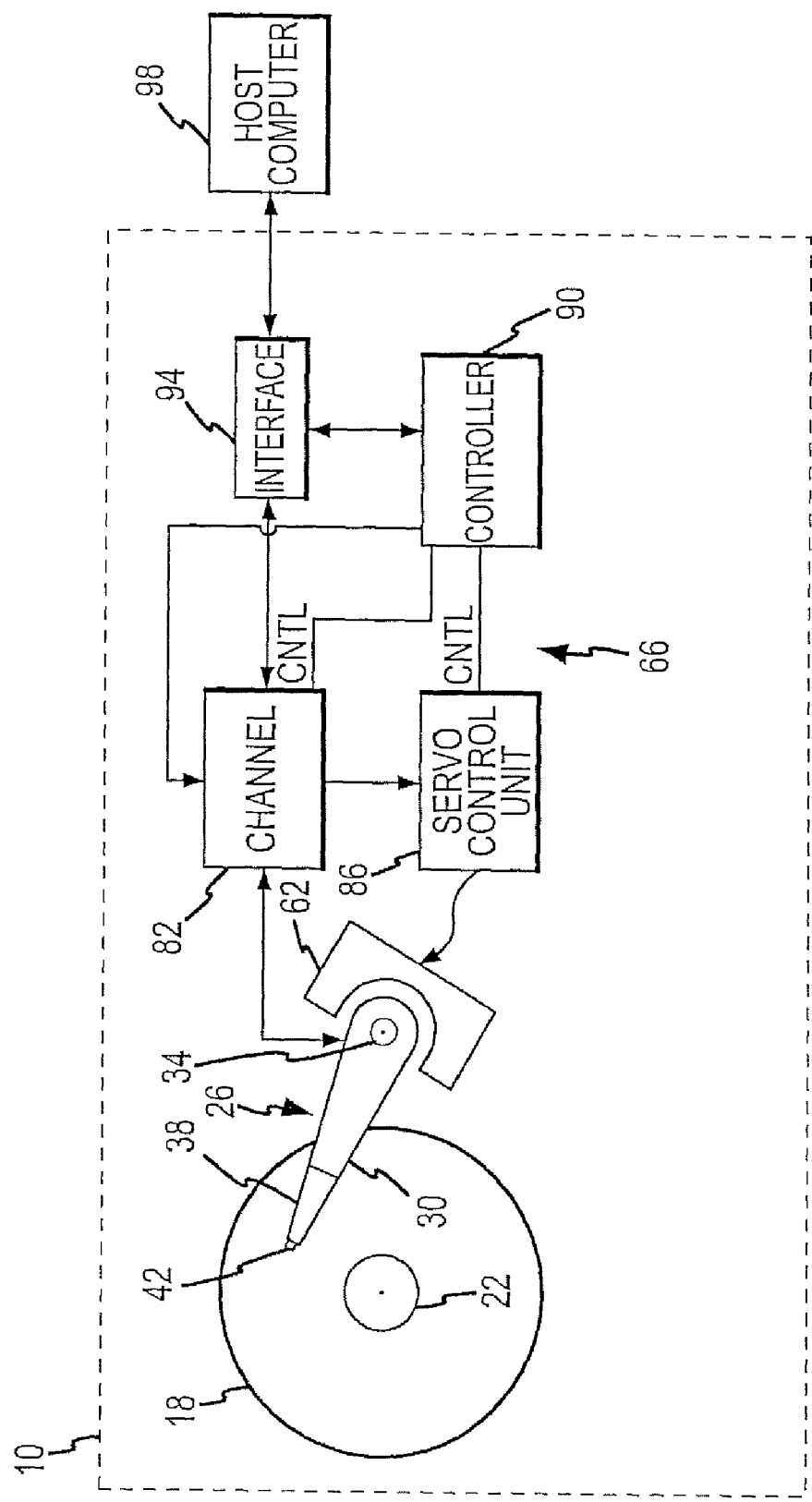
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal, from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

One embodiment of a disk drive that incorporates a number of air-actuated components is illustrated in FIG. 5 and is identified by reference numeral $10^i$. Components of the disk drive $10^i$ of FIG. 5 that correspond with a component of the disk drive 10 of FIGS. 1-4 are identified by the same reference numeral, and the corresponding discussion presented above remains equally applicable unless otherwise noted. Those corresponding components that differ in at least some respect are further identified by a superscripted "i" designation. For instance, each head-gimbal assembly or HGA $36^i$ of the head positioner assembly $26^i$ is illustrated as including a lift tab 39 for parking the head positioner assembly $26^i$. Moreover, the slider (e.g., slider 42) of each HGA $36^i$ is illustrated as being mounted on a deflectable tongue or the like of a flexure 40, which in turn is appropriately mounted to its corresponding suspension $38^i$.

The disk drive $10^i$ of FIG. 5 generally includes a load/unload ramp 100, what may be characterized as a ramp cam, ramp position controller, or ramp actuator 130 that includes an air flap arm 134, and an air flap actuator lock 170 (e.g., a head stack assembly lock 170; a head positioner assembly lock 170). Generally, the actuator lock 170 is air-actuated to unlock the head positioner assembly $26^i$ to accommodate an unloading of the head positioner assembly $26^i$ from its parked position on the load/unload ramp 100 for use in normal disk drive operations. The load/unload ramp 100 is movable between at least two general positions—a parked position for accommodating parking of the head positioner assembly $26^i$ on the load/unload ramp 100, and an operational position to accommodate normal disk drive operations. Preferably, the actuator lock 170 releases/unlocks the head positioner assembly $26^i$ prior to the load/unload ramp 100 moving from its parked position to its operational position. Finally, the ramp cam 130 is air-actuated and its motion is translated to the load/unload ramp 100 to move the same from its parked position to its operational position. Therefore, the load/unload ramp 100 is indirectly air-actuated in the illustrated embodiment via the ramp cam 130.

The actuator lock 170 cooperates with an actuator lock tab 180 on the head positioner assembly $26^i$ to retain the head positioner assembly $26^i$ in its parked position on the load/unload ramp 100 until sufficient air currents are generated by a rotation of one or more data storage disks 18 used by the disk drive $10^i$. Stated another way, the actuator lock 170 retains the head positioner assembly $26^i$ in its parked position on the load/unload ramp 100 until one or more data storage disks 18 used by the disk drive $10^i$ reach at least a certain rotational velocity. Each of the actuator lock 170 and the actuator lock tab 180 of the head positioned assembly $26^i$ may be of any appropriate size, shape, and/or configuration, and further may be disposed at any appropriate location so as to be able to cooperate to lock the head positioned assembly $26^i$ on the load/unload ramp 100; provided, however, that the force of air currents generated by rotation of one or more disks 18 of the disk drive $10^i$ is sufficient to move the actuator lock 170 and unlock the head positioner assembly $26^i$ at the desired time and/or in the desired manner.

Generally, the actuator lock 170 is disposed a suitable distance beyond a perimeter or outer diameter 20 of one or more of the data storage disks 18 (e.g., radially beyond). Although a closely spaced relation may be desirable between the actuator lock 170 and the perimeter 20 of one or more of the data storage disks 18 used by the disk drive $10^i$, preferably the actuator lock 170 does not come into contact any of the data storage disks 18 at any time. More specifically, the actuator lock 170 may be characterized as having a locking member 178 and an end 174. The locking member 178 may be of any appropriate size, shape, and/or configuration, but is it least generally in the form of a beam or a beam-like structure in the illustrated embodiment (e.g., an elongated structure). The end 174 of the actuator lock 170 is mounted to the air flap arm 134 of the ramp cam 130 in the illustrated embodiment.

Figure 6A:
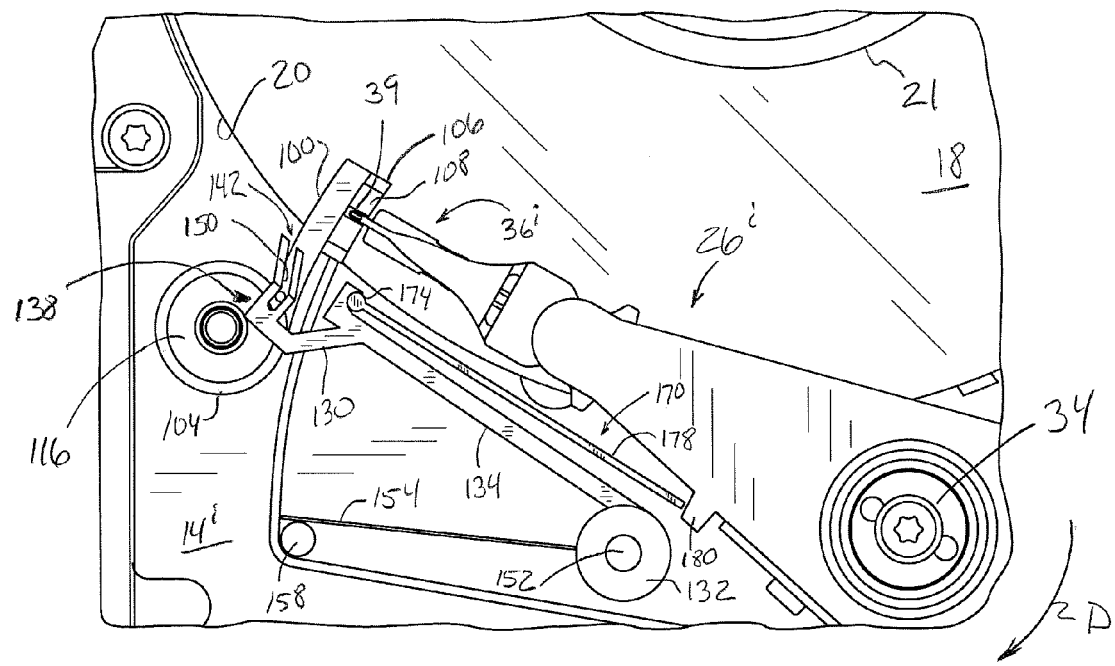
FIGS. 6A-J illustrate operation of the air-actuated load/unload ramp and air-actuated head positioner assembly lock of FIG. 5.
Figure 6B:
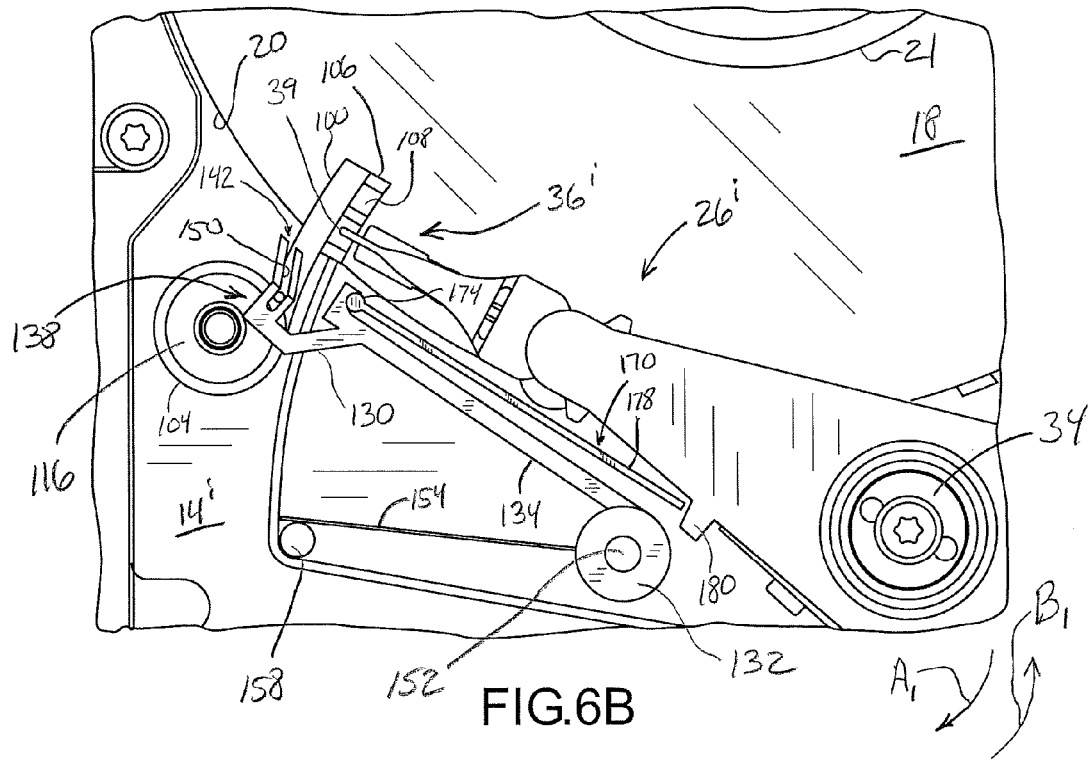

The end 174 of the actuator lock 170 could be fixed to the air flap arm 134 of the ramp cam 130, or the end 174 of the actuator lock 170 could be movably supported by the air flap arm 134 of the ramp cam 130 (e.g., so as to be able to swivel relative to the ramp cam 130 at least generally about the end 174 and in accordance with the arrows $A_1$ and $B_1$ in FIG. 6B). Moreover, the end 174 of the actuator lock 170 could be mounted to structures other than the ramp cam 130, for instance the base plate $14^i$ of the disk drive $10^i$ (e.g., fixedly; movably). In any case, the free end of the locking member 178 may be characterized as at least generally moving about a fixed axis (corresponding with the end 174). Other motions may be appropriate for the actuator lock 170. What is required is for the locking member 178 to be movable between at least a locking position and an unlocking position.

It is desirable for the locking member 178 of the actuator lock 170 to be exposed to air currents generated by a rotation of one or more data storage disks 18 used by the disk drive $10^i$, and to be moved at least generally away from the perimeter 20 of these data storage disks 18 by the corresponding force to unlock the head positioner assembly $26^i$ at a desired time (e.g., by the locking member 178 moving at least generally about its corresponding end 174 in the direction 20 indicated by the arrow $A_1$ in FIG. 6B). The actuator lock 170 could at least substantially retain its shape and pivot at least generally about its end 174 in the direction of the arrow $A_1$ (FIG. 6B) to provide this movement (e.g., via a swivel or swivel-like action between the end 174 of the actuator lock 170 and the air flap arm 134 of the ramp cam 130, and where the locking member 178 at least substantially retains its shape (e.g., does not appreciably deflect or flex)). In this case, it would be desirable to incorporate an appropriate biasing member for biasing the actuator lock 170 back toward its locking position (e.g., to move the locking member 178 in accordance with the arrow $B_1$ (FIG. 6B) into locking engagement with the head positioner assembly $26^i$ when parked on the load/unload ramp 100). Another option would be for the locking member 178 to deflect or flex (e.g., at least somewhat elastically) in the direction of the arrow $A_1$ (FIG. 6B) when exposed to sufficient forces generated by air currents from the rotation of one or more data storage disks 18 used by the disk drive $10^i$ while its end 174 is maintained in a fixed position relative to the air flap arm 134 of the ramp cam 130 (or more generally the structure to which the end 174 is fixedly mounted in this example). The elasticity of the locking member 178 of the actuator lock 170 would thereby bias the locking member 178 back toward its locking position or in the direction of the arrow $B_1$ (FIG. 6B) where the locking member 178 appropriately engages the actuator lock tab 180 of the head positioner assembly $26^i$ to lock the head positioner assembly $26^i$ on the load/unload ramp 100. What is generally required is for the locking member 178 to move between at least two general positions.

Based upon the foregoing, it should be appreciated that the actuator lock 170 is an air-actuated component of the disk drive $10^i$. In the illustrated embodiment, the force generated by the air currents from rotation of one or more disks 18 provides the sole force for moving the actuator lock 170 from its locked position to its unlocked position.

The ramp cam, ramp position controller, or ramp actuator 130 is air-actuated and mechanically moves the load/unload ramp 100 from its parked position to its operational position. Therefore, the load/unload ramp 100 is ultimately air-actuated in the illustrated embodiment, albeit indirectly via the ramp cam 130. The ramp cam 130 includes a body 132 that is mounted on what may be characterized as a pivot 152. Generally, the ramp cam 130 is movable about the pivot 152 in a manner that will be discussed in more detail below (e.g., arrows $A_2$ and $B_2$ in FIG. 6D). The pivot 152 may be in the form of a bearing to accommodate movement of the ramp cam 130 and relative to the base plate $14^i$ between at least two general positions, may simply be in the form of a fixed pivot pin or the like, or of any appropriate configuration that allows the ramp cam 130 to move relative to the base plate $14^i$ between at least two positions to in turn move the load/unload ramp 100 between its parked and operational positions (e.g., a movement of the ramp cam 130 about a fixed axis, although other motions may be appropriate for the ramp cam 130). It may be preferable to realize reduced frictional forces between the ramp cam 130 and its pivot 152.

A biasing member 154 biases the ramp cam 130 in the direction indicated by the arrow $B_2$ (FIG. 6D) and into a position that disposes the load/unload ramp 100 in its parked position. In the illustrated embodiment, the biasing member 154 is in the form of a hinge spring or the like, having one end that engages an anchor 158 fixed to the base place 14$^i$, and another end (not shown) that biases the ramp cam 130 into a position that disposes the load/unload ramp 100 in its parked position. The pivot 152 could in fact be part of the biasing member 154. For instance, a second leg of the biasing member 154 could extend within or be part of the air flap arm 134 of the ramp cam 130, although such may not be required in all instances. Any appropriate way for biasing the ramp cam 130 into a position that disposes the load/unload ramp 100 into its parked position may be utilized.

The ramp cam 130 translates motion to the load/unload ramp 100 using its air flap arm 134. The air flap arm 134 is disposed beyond a perimeter 20 of one or more of the data storage disks 18 used by the disk drive 10$^i$. In the illustrated embodiment, the locking member 178 of the air flap actuator lock 170 is disposed between the air flap arm 134 and the perimeter 20 of one or more data storage disks 18 used by the disk drive 10$^i$. A space exists between at least a part of the locking member 178 of the actuator lock 170 and the air flap arm 134 of the ramp cam 130 in the illustrated embodiment and with the load/unload ramp 100 being disposed in its parked position, although such may not be required in all instances.

A camming head 138 of the ramp cam 130 is disposed on an end of its associated air flap arm 134 and includes an appropriately shaped groove 142 (e.g., a cam groove) that interfaces with a cam pin or cam follower 112 of the load/unload ramp 100. The groove 142 includes a first groove section 146 and a second groove section 150. The cam pin 112 of the load/unload ramp 100 is disposed within the first groove section 146 when the head positioner assembly 26$^i$ is in its parked position on the load/unload ramp 100, and when the load/unload ramp 100 is in its parked position. Air currents generated by rotation of one or more data storage disks 18 used by the disk drive 10$^i$ will move the air flap arm 134 at least generally away from the perimeter 20 of the data storage disks 18 to increase the spacing therebetween (e.g., in accordance with the arrow $A_2$ in FIG. 6D). This movement will cause the cam pin 112 of the load/unload ramp 100 to move from the first groove section 146 and into the second groove section 150 of the camming head 138 for the ramp cam 130. Movement of the cam pin 112 of the load/unload ramp 100 along the second groove section 150 of the ramp cam 130 moves the load/unload ramp 100 from its parked position (e.g., FIG. 5) to its operational position (e.g., FIG. 6F).

Based upon the foregoing, it should be appreciated that the ramp cam 130 is an air-actuated component of the disk drive 10$^i$. In the illustrated embodiment, the force generated by the rotation of one or more disks 18 provides the sole force for moving the ramp cam 130 to in turn move the load/unload ramp 100 from its parked position to its operational position.

The load/unload ramp 100 for the disk drive 10$^i$ of FIG. 5 includes a body 104 that is mounted on and movable relative to what may be characterized as a pivot 116. Generally, the load/unload ramp 100 is movable about the pivot 116 in a manner that will be discussed in more detail below (e.g., arrows $A_3$, $B_3$ in FIG. 6E). This movement may be characterized as being at least generally about a fixed axis. Other types of motions may be appropriate.

The pivot 116 may be in the form of a bearing to accommodate movement of the load/unload ramp 100 at least generally between its parked and operational positions, may simply be in the form of a fixed pivot pin or the like, or of any appropriate configuration that allows the load/unload ramp 100 to move relative to the base plate 14$^i$ between its parked and operational positions. The pivot 16 may also include a biasing member of any appropriate type (e.g., a hinge spring) for purposes of biasing the load/unload ramp 100 in the direction indicated by the arrow $B_3$ in FIG. 6E (e.g., to bias the load/unload ramp 100 toward the above-noted parked position), although such may not be required in all instances.

The load/unload ramp 100 also includes the above-noted cam pin or cam follower 112. An appropriate force is exerted on the cam pin 112 by the ramp cam 130 to move the load/unload ramp 100 from its parked position to its operational position, and as will be discussed in more detail below. This same interaction between the camming head 138 and the cam pin 112 may also move the load/unload ramp 100 from its operational position back to its parked position.

One or more ramp sections 106 extend from the body 104 of the load/unload ramp 100 and are positionable over a corresponding data storage disk 18, between a corresponding pair of data storage disks 18, and/or under a corresponding data storage disk 18 when the load/unload ramp 100 is in its parked position. That is, each ramp section 106 is aligned with each data storage disk 18 used by the disk drive 10$^i$ in a dimension that corresponds with the rotational axis of these disks 18. One ramp section 106 is provided for each HGA 36$^i$ used by the head positioner assembly 26$^i$ of the disk drive 10$^i$. Each ramp section 106 includes what may be characterized as an unloading surface 108 that is appropriately shaped to direct the slider (e.g., slider 42) of its corresponding HGA 36$^i$ to a position where it is spaced from its corresponding data storage disk 18 when the head positioner assembly 26$^i$ is moved to its parked position on the load/unload ramp 100. One or more features may be incorporated into the load/unload ramp 100 to provide at least some type of "lock" for the head positioner assembly 26$^i$ in its parked position (e.g., an indentation or the like on one or more unloading surfaces 108 of the load/unload ramp 100).

The operation of the above-noted actuator lock 170, the ramp cam or ramp position controller 130, and the load/unload ramp 100 may be summarized in reference to FIGS. 6A-J. The disk drive 10$^i$ is in an un-powered or "off state" in FIG. 6A. At this time: 1) the load/unload ramp 100 is in its parked position (note that a portion of each ramp section 106 of the load/unload ramp 100 is aligned with an outer portion of the various data storage disks 18 used by the disk drive 10$^i$ in a dimension corresponding with the rotational axis of these disks 18; each ramp section 106 "projects" onto a corresponding disk, where the projection extends in the same dimension that the rotational axis of the disk(s) 18 extends); 2) the head positioned assembly 26$^i$ is parked on the load/unload ramp 100 (note the position of the lift tab 39 on the unloading surface 108 of the ramp section 106 illustrated in FIG. 6A, which again disposes its corresponding slider (e.g., slider 42) in spaced relation to its corresponding data storage disk 18); and 3) the locking member 178 of the actuator lock 170 is in position to lock the head positioner assembly 26$^i$ in its parked position on the load/unload ramp 100 (e.g., the end of the locking member 178 is positioned to engage the actuator lock tab 180 on the head positioner assembly 26$^i$ to thereafter restrain movement of the head positioner assembly 26$^i$ in a direction that would unload the same from the load/unload ramp 100—the direction of the arrow D in FIG. 6A; or stated another way, the head positioner assembly 26$^i$ would be restrained from having its various HGAs 36' move radially inwardly relative to the various data storage disks 18 used by the disk drive 10$^i$ ("radially inwardly" being at least generally toward the rotational axis of the various disks 18 or at least generally toward the inner diameter 21 thereof) once the locking member 178 engages the actuator lock tab 180 on the head position assembly 26$^i$).

FIG. 6B illustrates a bias that may be used for the head positioner assembly 26$^i$ when the disk drive 10$^i$ is initially powered up or turned on. That is, the disk drive 10$^i$ may be configured to move the head positioner assembly 26$^i$ in the opposite direction of the arrow D in FIG. 6A at the initial startup of the disk drive 10. This does not impact the operation of the load/unload ramp 100 or the actuator lock 170.

Figure 6C:
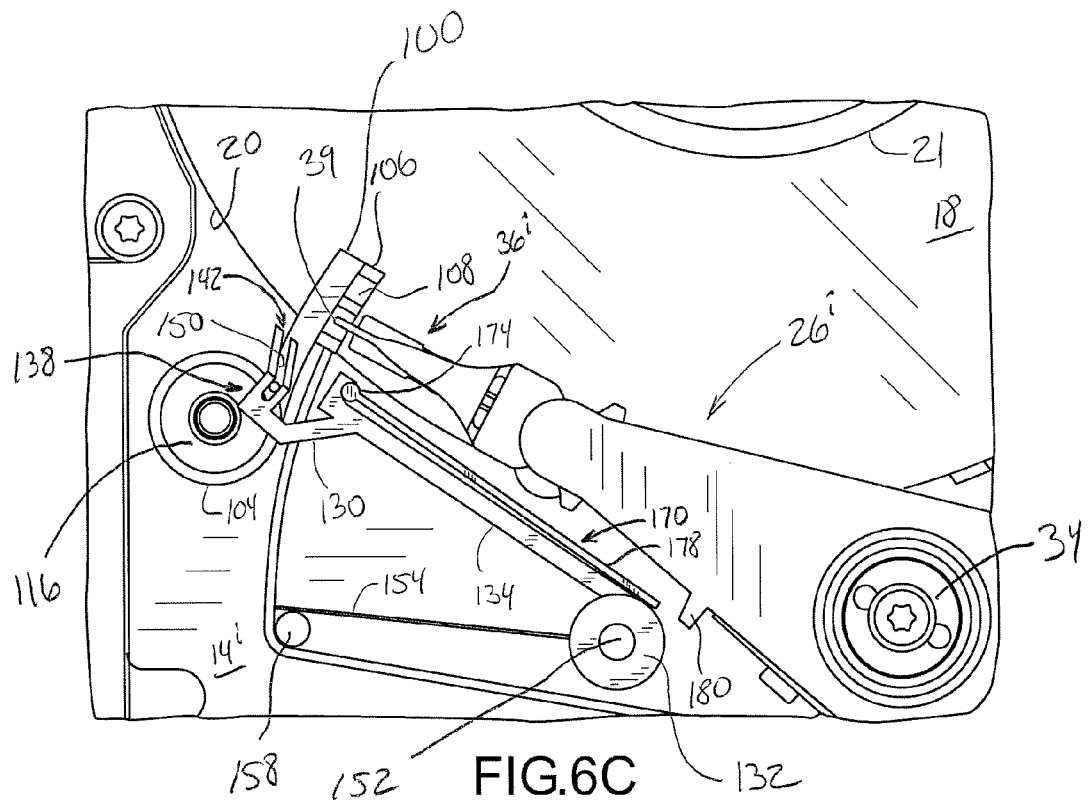

Powering on the disk drive 10$^i$ initiates rotation of each of its data storage disks 18. This rotation of one or more data storage disks 18 generates an airflow or air currents that exert a force on the locking number 178 of the actuator lock 170 in a direction that is at least generally away from the rotational axis of the disks 18 or at least generally away from the inner diameter 21 thereof. FIG. 6C illustrates that once the data storage disks 18 reach at least a certain rotational speed, these air currents will exert a sufficient force on the locking member 178 of the actuator lock 170 to move the locking member 178 at least generally in accordance with the arrow $A_1$ (FIG. 6B) to disengage the locking member 178 from the actuator lock tab 180 of the head positioner assembly 26$^i$. This then allows the head positioner assembly 26$^i$ to be moved off of the load/unload ramp 100, although the interface between the lift tab(s) 39 (HGA 36$^i$) and its corresponding unloading surface 108 (ramp 100) could still provide at least some retentive force.

Figure 6D:
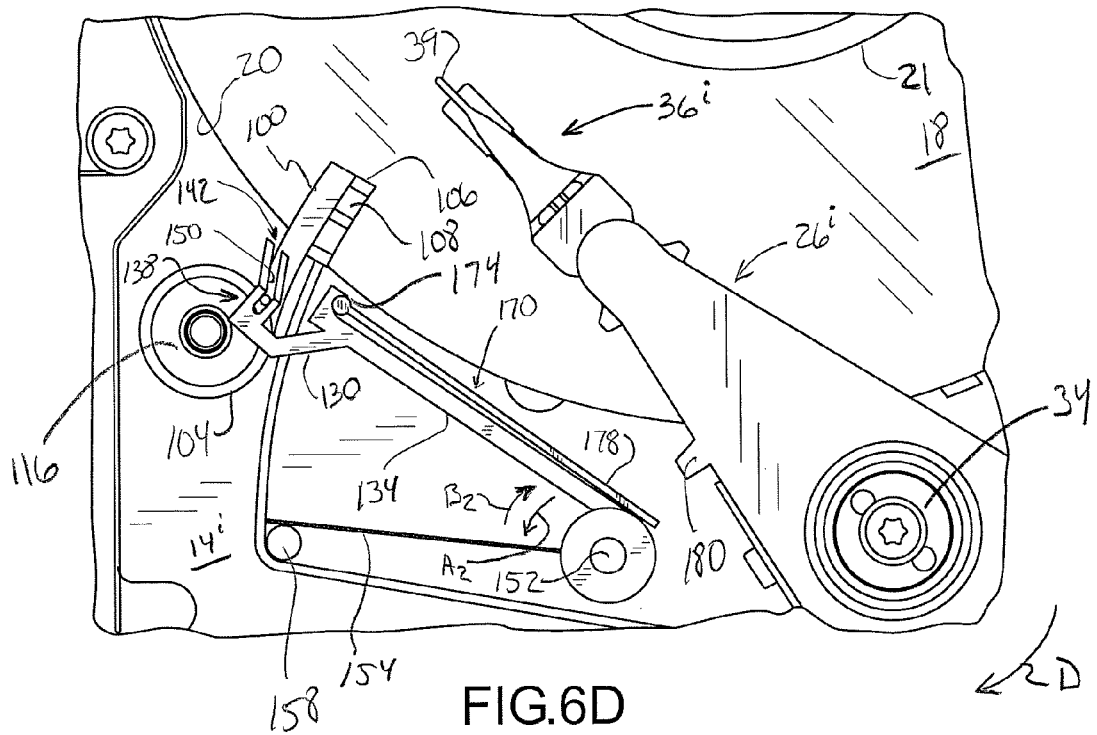

Typically after the various data storage disks 18 reach a certain rotational speed, the head positioner assembly 26$^i$ is moved at least generally in accordance with the arrow D to load each of its sliders (e.g., slider 42) onto its corresponding data storage disk 18 and as illustrated in FIG. 6D. That is, the head positioner assembly 26$^i$ is unloaded from or moved off of the load/unload ramp 100. At this time, the load/unload ramp 100 is still in its parked position, although it could move to a small degree toward its operational position at this time.

Figure 6E:
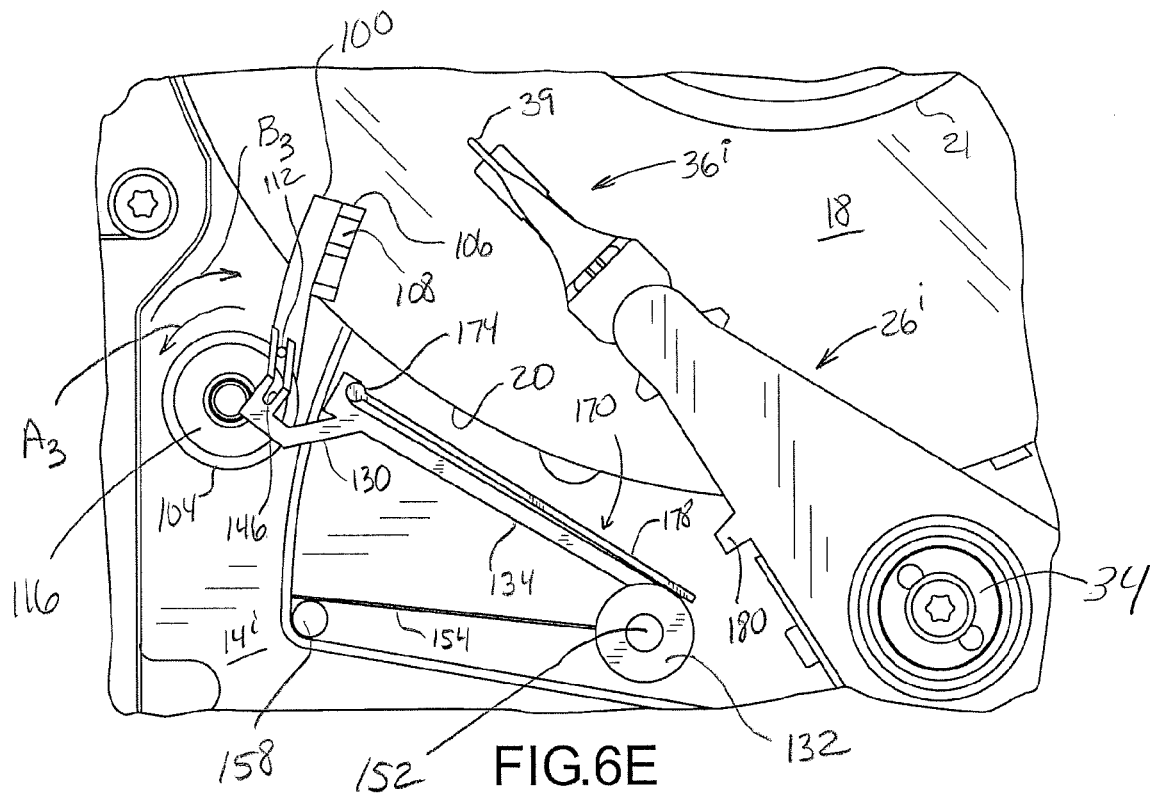

The load/unload ramp 100 moves to its operational position at least some time after the head positioner assembly 26$^i$ has been moved off of the load/unload ramp 100 and as illustrated in FIG. 6E. Again, the rotation of one or more data storage disks 18 generates an airflow or air currents that exert a force on the locking number 178, the air flap arm 134 of the ramp cam 130, or both in a direction that is at least generally away from the rotational axis of the disks 18 or from their respective inner diameter 21. Once the data storage disks 18 reach at least a certain rotational speed (usually a higher rotational speed than when the head positioner assembly 26$^i$ is unloaded from the load/unload ramp 100), these air currents will exert a sufficient force on the locking member 178 of the actuator lock 170, the air flap arm 134 of the ramp cam 130, or both to move the locking member 178 at least generally in accordance with the arrow $A_1$ (FIG. 6B) and the ramp cam 130 at least generally in accordance with the arrow $A_2$ (FIG. 6D), respectively—a movement at least generally away from the perimeter 20 of the various disks 18. Movement of the air flap arm 134 of the ramp cam 130 in the direction of the arrow $A_2$ (FIG. 6D) causes the camming head 138 to exert a force on the cam pin 112 of the load/unload ramp 100. As noted above, the cam pin 112 of the load/unload ramp 100 moves along the groove 142 of the camming head 138. Once the cam pin 112 exits the first groove section 146 and enters the second groove section 150 of the camming head 138, and thereafter continues to move along this second groove section 150, the load/unload ramp 100 will move at least generally about the pivot 116 in the direction of the arrow $A_3$ and into the position illustrated in FIG. 6E.

The load/unload ramp 100 reaches its operational position with the cam pin 112 still being within the second groove section 150 of the camming head 138, and again which is illustrated in FIG. 6E. A mechanical stop (not shown) could be included to ensure that the cam pin 112 does indeed remain within the groove 142 of the camming head 138 at all times. The forces being generated by the rotation of the various data storage disks 18 of the disk drive 10$^i$ (which typically rotate at a constant speed during normal disk drive operations) should be sufficient to maintain the load/unload ramp 100 in at least somewhat of a fixed position relative to the various data storage disks 18, and in the operational position of FIG. 6E. However, the operational position of the load/unload ramp need not be a single, fixed position, but instead may coincide with any position of the load/unload ramp 100 that does not impede the movement of the head positioner assembly 26$^i$ during normal disk drive operations.

Figure 6F:
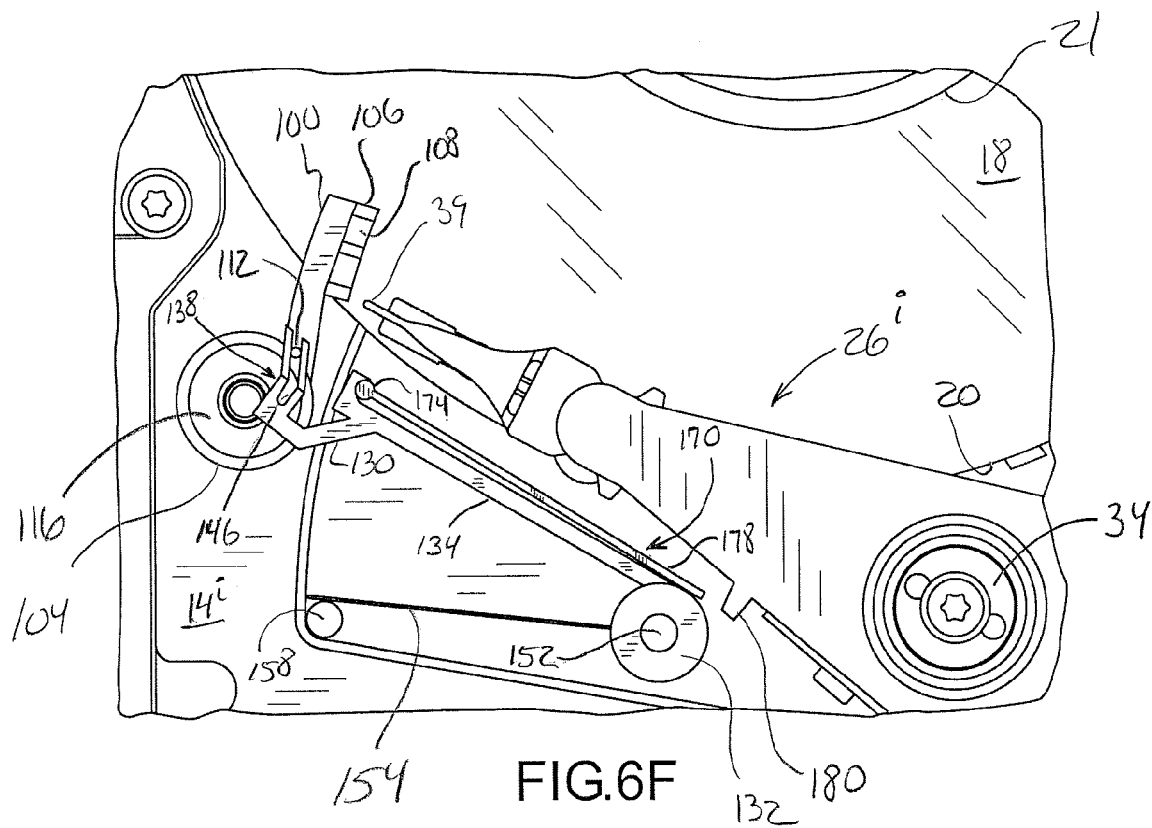

There are a number of points of note when the load/unload ramp 100 is in its operational position. One is that the load/unload ramp 100 is still aligned with each of the data storage disks 18 in a dimension corresponding with the rotational axis of the data storage disks (e.g., each ramp section 106 is disposed "above" or "below" a particular data storage disk 18). However, the load/unload ramp 100 has sufficiently moved to allow the head positioner assembly 26$^i$ to move to a position previously occupied by the load/unload ramp 100 and as illustrated in FIG. 6F. Stated another way and with the load/unload ramp 100 being in its operational position, the head positioner assembly 26$^i$ is able to move closer to the perimeter 20 of each data storage disk 18 used by the disk drive 10$^i$ versus if the load/unload ramp 100 had remained in its parked position. That is and if the load/unload ramp 100 had remained in its parked position, an outer annular region of the data storage disks 18 would not be available for memory storage based upon the positioning of the load/unload ramp 100 in this outer region. Therefore, the movement of the load/unload ramp 100 from its parked position to its operational position increases the portion of each data storage disk 18 that is available for data storage.

Figure 6G:
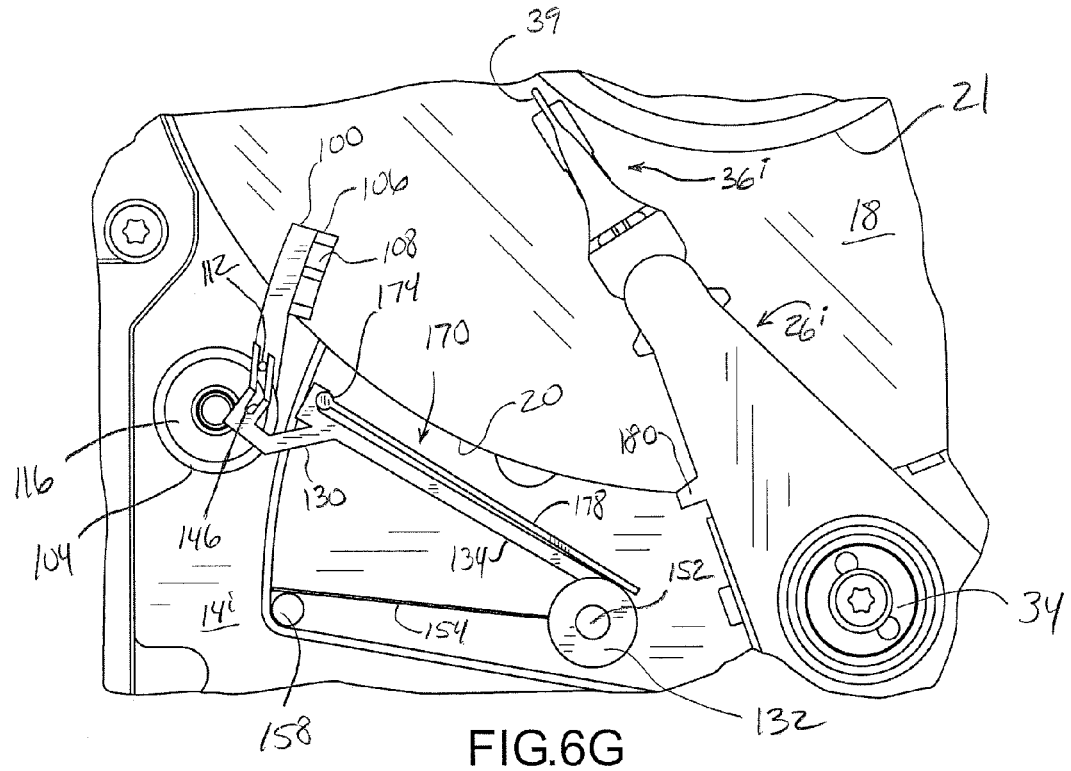
Figure 6H:
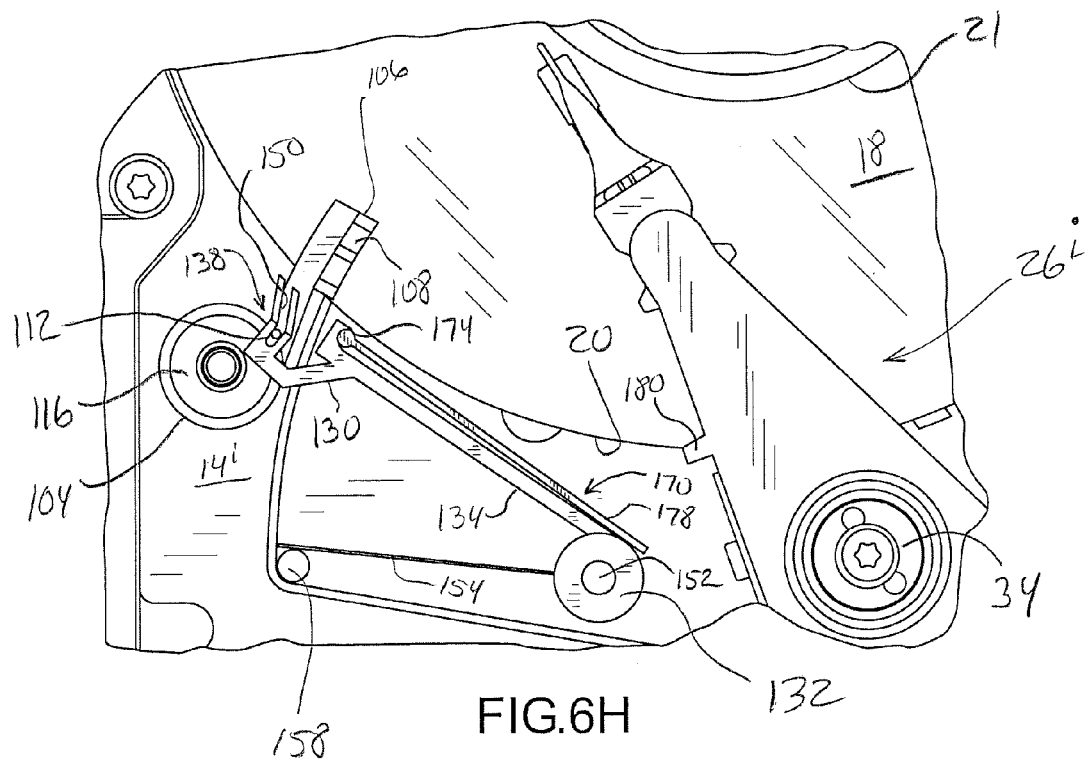

FIG. 6G illustrates one type of power-down sequence that may be employed in relation to the disk drive 10$^1$, although others may be appropriate. In the illustrated embodiment, the head positioner assembly 26$^i$ moves to at least generally to the inner diameter 21 of the various data storage disks 18. During the time that the head positioner assembly 26$^i$ moves toward the inner diameter 21 of the data storage disks 18 or upon reaching the inner diameter 21, the rotational speed of the various data storage disks 18 may be reduced. This reduction in the rotational speed of each data storage disk 18 provides a corresponding reduction in the force that the air currents are exerting on the air flap arm 134 of the ramp cam 130, on the locking member 178 of the actuator lock 170, or both. As a result, the air flap aim 134 will move at least generally in the direction of the arrow $B_2$ (FIG. 6D) and based upon the biasing forces provided by the biasing member 154. This in turn will cause the cam pin 112 on the load/unload ramp 100 to move along the second groove section 150 of the camming head 138 of the ramp cam 130 back toward the first groove section 146. Movement of the cam pin 112 within the second groove section 150 of the camming head 138 toward the first groove section 146 will move the load/unload ramp 100 from its operational position back toward its parked position. Once the rotational speed of the various data storage disks 18 is sufficiently reduced, the biasing forces provided by the biasing member 154 will dispose the cam pin 112 in the first groove section 146 of the camming head 138 of the air flap arm 134, and as illustrated in FIG. 6H. At this time, the load/unload ramp 100 is in its parked position. Note that the locking member 178 of the actuator lock 170 is still in contact with the air flap arm 134 of the ramp cam 130 at this time, as the head positioner assembly 26$^i$ has not yet been parked on the load/unload ramp 100.

Figure 6I:
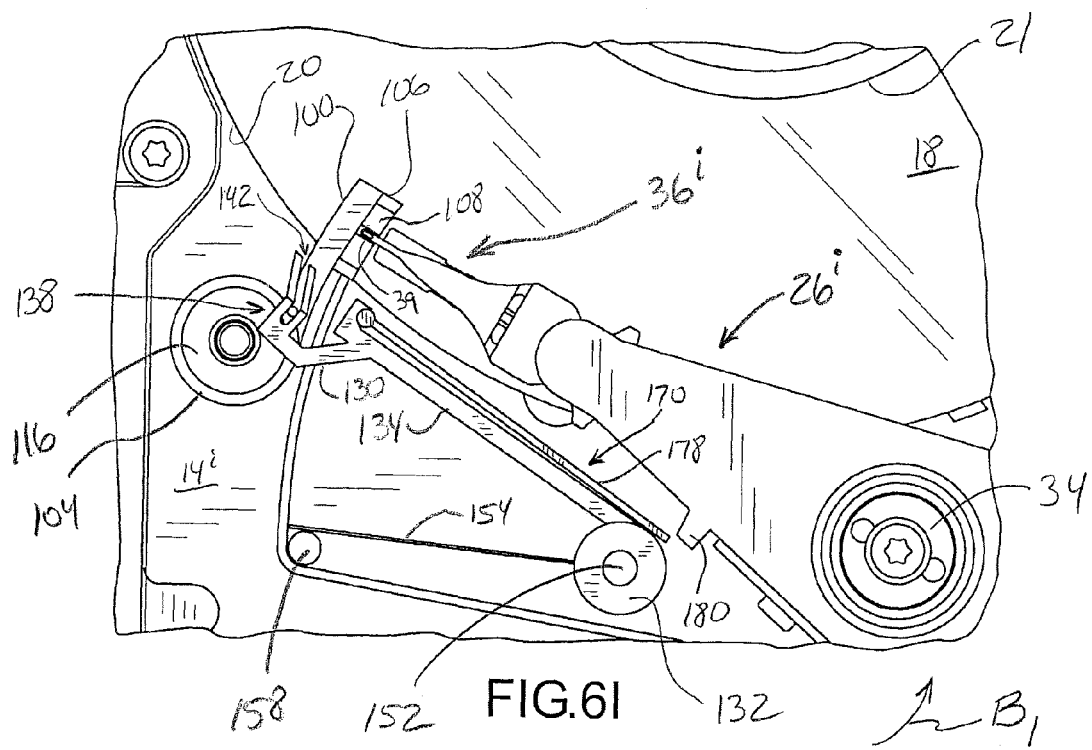
Figure 6J:
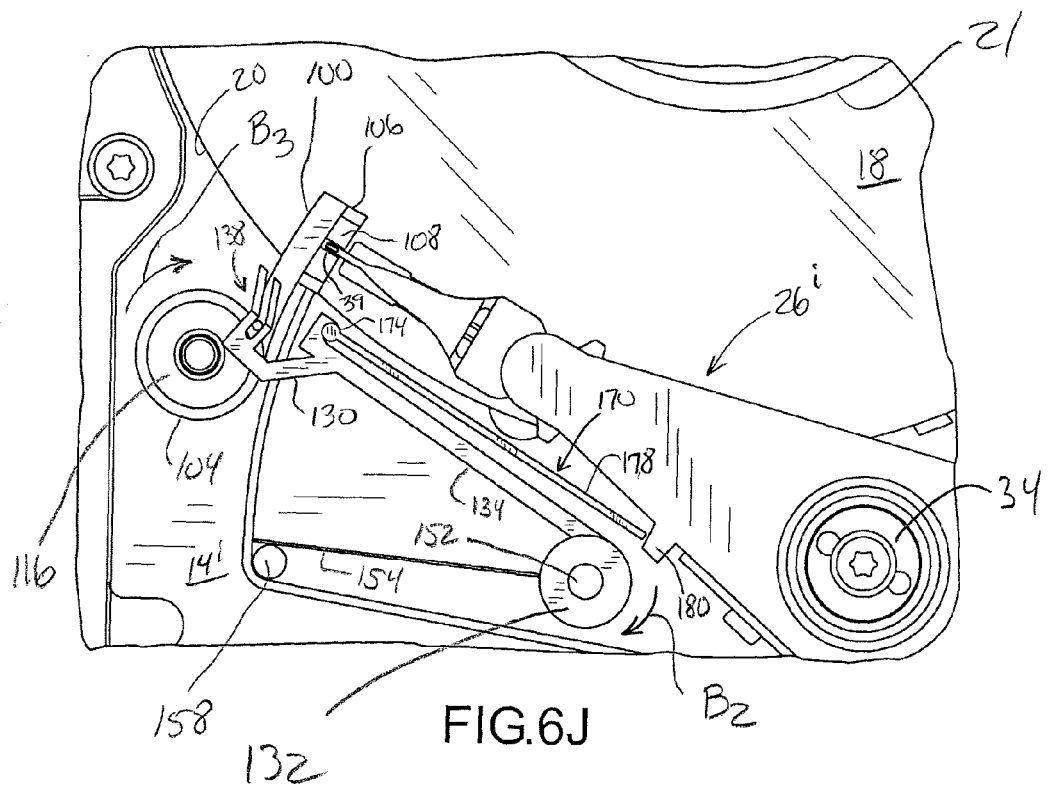

The head positioner assembly 26$^i$ may be moved toward and onto the load/unload ramp 100 as the rotational speed of the various data storage disks 18 continues to be reduced and with the load/unload ramp 100 being in its parked position. This is illustrated in FIG. 6I. At this time, the air currents generated by the rotation of the various data storage disks 18 is still sufficient to maintain the position of the locking member 178 of the actuator lock 170 against the air flap arm 134 of the ramp cam 130 to allow the head positioner assembly 26$^i$ to move to the parked position on the load/unload ramp 100. Stated another way, the locking member 178 remains in a position that does not impede the ability of the head positioner assembly 26$^i$ to reach its parked position on the load/unload ramp 100. Preferably, the locking member 178 remains disengaged from the head positioner assembly 26$^i$ until the lift tab 39 of each HGA 36' has moved along its corresponding unloading surface 108 of the ramp 100 to where the head positioner assembly 26$^i$ reaches its parked position and its motion is terminated. Once again, the engagement of the lift tab 39 of each HGA 36' with its corresponding unloading surface 108 of the load/unload ramp 100 disposes its corresponding slider (e.g., slider 42) in spaced relation to its corresponding data storage disk 18. Thereafter, a continued reduction of the rotational speed of the various data storage disks 18 allows the locking member 178 of the actuator lock 170 to move in the direction of the arrow B$_1$ (FIG. 6B) into a position for cooperating with the actuator lock tab or locking member 180 of the head positioner assembly 26$^i$, and as illustrated in FIG. 6J. Cooperation between the locking member 178 of the actuator lock 170 and the actuator lock tab 180 of the head positioner assembly 26$^i$ "locks" the head positioner assembly 26$^i$ on the load/unload ramp 100.

Figure 7:
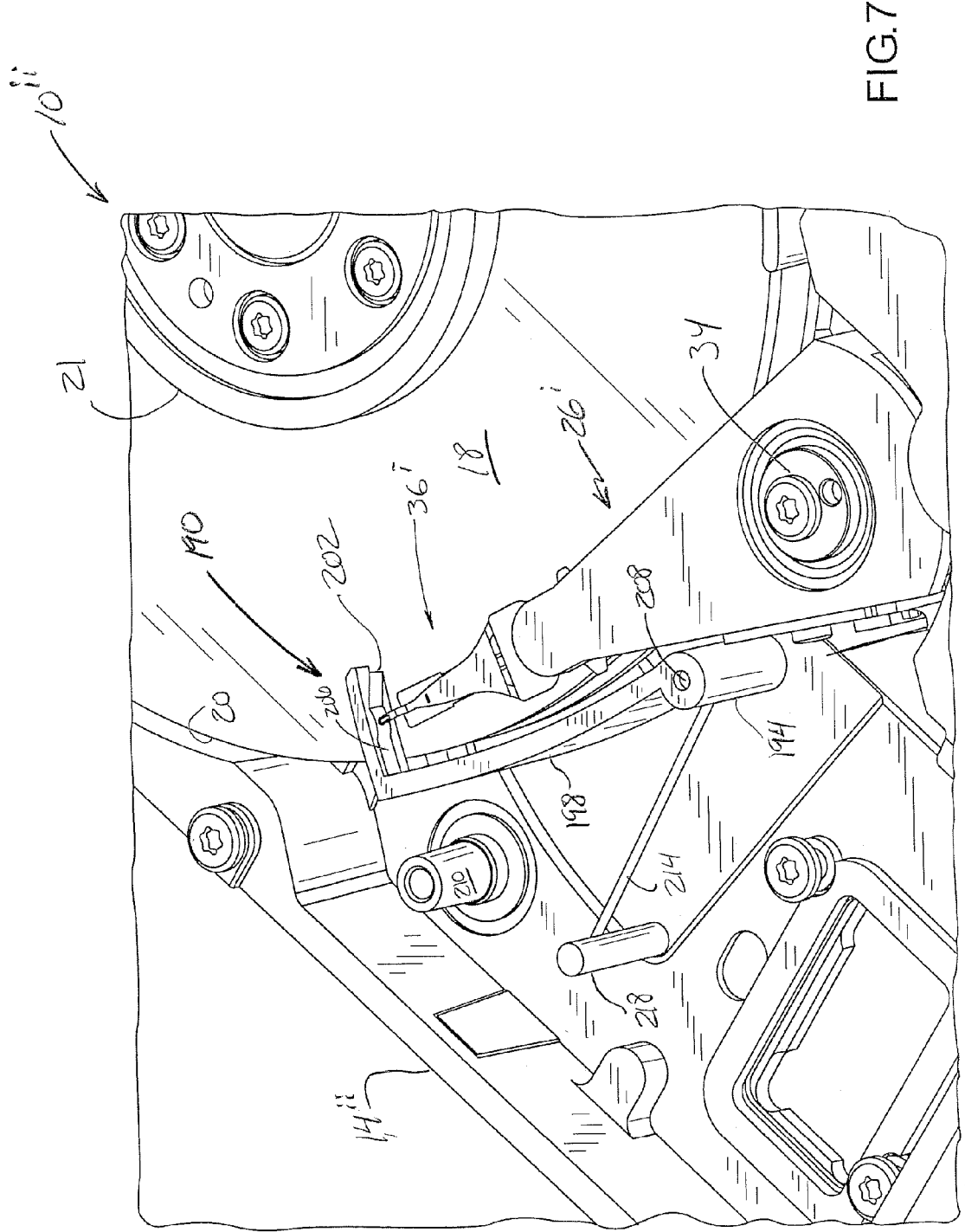
FIG. 7 is a perspective view of another embodiment of an air-actuated load/unload ramp.

FIG. 7 illustrates another embodiment of a disk drive that incorporates an air-actuated component and that is identified by reference numeral 10$^{ii}$. Components of the disk drive 10$^{ii}$ of FIG. 7 that correspond with a component of the disk drive 10 of FIGS. 1-4 are identified by the same reference numeral, and the corresponding discussion presented above remains equally applicable unless otherwise noted. Initially, the disk drive 10$^{ii}$ uses the above-noted head positioner assembly 26$^i$ from the embodiment of FIG. 5. Moreover, the disk drive 10$^{ii}$ uses a dynamic or air-actuated load/unload ramp 190.

The load/unload ramp 190 is air-actuated and is movable between at least two general positions—a parked position for accommodating parking of the head positioner assembly 26$^i$ on the load/unload ramp 190, and an operational position to accommodate normal disk drive operations. Generally, the load/unload ramp 190 includes a body 194, and is movable at least generally about a pivot 208 in a manner that will be discussed in more detail below (e.g., at least generally about a fixed axis, although other motions may be appropriate for the load/unload ramp 190). The pivot 208 may be in the form of a bearing to accommodate movement of the load/unload ramp 190 between its parked and operational positions, may simply be in the form of a fixed pivot pin or the like, or of any appropriate configuration that allows the load/unload ramp 190 to move relative to the base plate 14$^{ii}$ between its parked and operational positions. A biasing member 214 biases the load/unload ramp 190 to its parked position. The pivot 208 may incorporate the biasing member 214 (e.g., a hinge spring) for purposes of biasing the load/unload ramp 190 to its parked position, although such a biasing member 214 may be incorporated in any appropriate manner.

The load/unload ramp 190 further includes an air flap arm 198 that extends from the body 194. One or more ramp sections 202 extend from a distal end of this air flap arm 198. Each ramp section 202 includes an unloading surface 206, and is in accordance with the ramp section 106 discussed above in relation to the FIG. 5 embodiment such that this discussion need not be repeated.

The air flap arm 198 of the load/unload ramp 190 may be of any appropriate size, shape, and/or configuration. In any case, the air flap arm 198 is disposed beyond the perimeter or outer diameter 20 of one or more of the data storage disks 18 used by the disk drive 10$^{ii}$ (e.g., radially beyond). Although a closely spaced relation may be desirable between the air flap arm 198 and the perimeter 20 of one or more of the data storage disks 18 used by the disk drive 10$^{ii}$, preferably the air flap arm 198 does not come into contact with any of the data storage disks 18 at any time.

The disk drive 10$^{ii}$ utilizes a biasing member 214 for biasing the load/unload ramp 190 to its parked position. The biasing member 214 may be of any appropriate size, shape, configuration, and/or type to provide this biasing function. In the illustrated embodiment, the biasing member 214 is in the form of a hinge spring or the like, having one end that engages an anchor 218 fixed to the base plate 14$^{ii}$, and another end (not shown) that biases the air flap arm 198 into a position that disposes the load/unload ramp 190 in its parked position. The pivot 208 could in fact be part of the biasing member 214, and where a second leg of the biasing member 214 could extend within or be part of the air flap arm 198, although such may not be required in all instances. Any appropriate way for biasing the air flap arm 198 into a position that disposes the load/unload ramp 190 in its parked position may be utilized. For instance, the air flap arm 198 could be in the form of a deflectable cantilever or the like that is attached to the base plate 14$^{ii}$ at a location corresponding with the anchor 218. In the illustrated embodiment, the force generated by the air currents from the rotation of the disk(s) 18 is the sole force used to move the load/unload ramp 190 from its parked position to its operational position.

The operation of the dynamic load/unload ramp 190 may be summarized with continued reference to FIG. 7. FIG. 7 illustrates the parked position for the load/unload ramp 190, and where the head positioner assembly 26$^i$ is in its parked position on/relative to the load/unload ramp 190. Powering on the disk drive 10$^{ii}$ initiates rotation of each of the data storage disks 18 used by the disk drive 10$^{ii}$. The bias of the head positioner assembly 26$^i$ discussed above with regard to FIG. 6B may be utilized by the disk drive 10$^{ii}$ as desired/required. Powering on the disk drive 10$^{ii}$ also initiates rotation of each of its data storage disks 18. Typically after the various data storage disks 18 reach a certain rotational speed, the head positioner assembly 26$^i$ is moved at least generally in the direction of the inner diameter 21 of the disk(s) 18 to load each of its sliders (e.g., slider 42) onto its corresponding data storage disk 18 (e.g., similar to FIG. 6D). That is, the head positioner assembly 26$^i$ is unloaded from or moved off of the load/unload ramp 190. At this time, the load/unload ramp 190 is still in its parked position, although it may move to a small degree toward its operational position at this time.

The load/unload ramp 190 moves to its operational position at least some time after the head positioner assembly 26$^i$ has been moved off of the load/unload ramp 190. Rotation of one or more data storage disks 18 generates an airflow or air currents that exert a force on the air flap arm 198 of the load/unload ramp 190 in a direction that is at least generally away from the rotational axis of the disks 18 or at least generally away from the respective inner diameter 21. Once the data storage disks 18 reach at least a certain rotational speed (usually a higher rotational speed than when the head positioner assembly 26$^i$ is unloaded from the load/unload ramp 190), these air currents will exert a sufficient force on the air flap arm 198 of the load/unload ramp 190 to begin moving the load/unload ramp 190 at least generally towards its operational position (e.g., similar to FIG. 6E, and which provides the above-noted benefits). In this regard, the disk drive 10$^{ii}$ may include a stop 210 to establish the operational position for the load/unload ramp 190, although such may not be required in all instances. During a power-down cycle and as the rotational speed of the various data storage disks 18 is continually reduced, the biasing force provided by the biasing member 214 will move the load/unload ramp 190 from its operational position (e.g., similar to FIG. 6E) back to the parked position of FIG. 7 (e.g., the biasing force provided by the biasing member 214 will overcome the forces being exerted on the air flap arm 198 by the air currents being generated by rotation of the various data storage disks 18 of the drive 10$^{ii}$). Thereafter, the head positioner assembly 26$^i$ may be parked at least generally in the manner discussed above with regard to the embodiment of FIG. 5.

Figure 8:
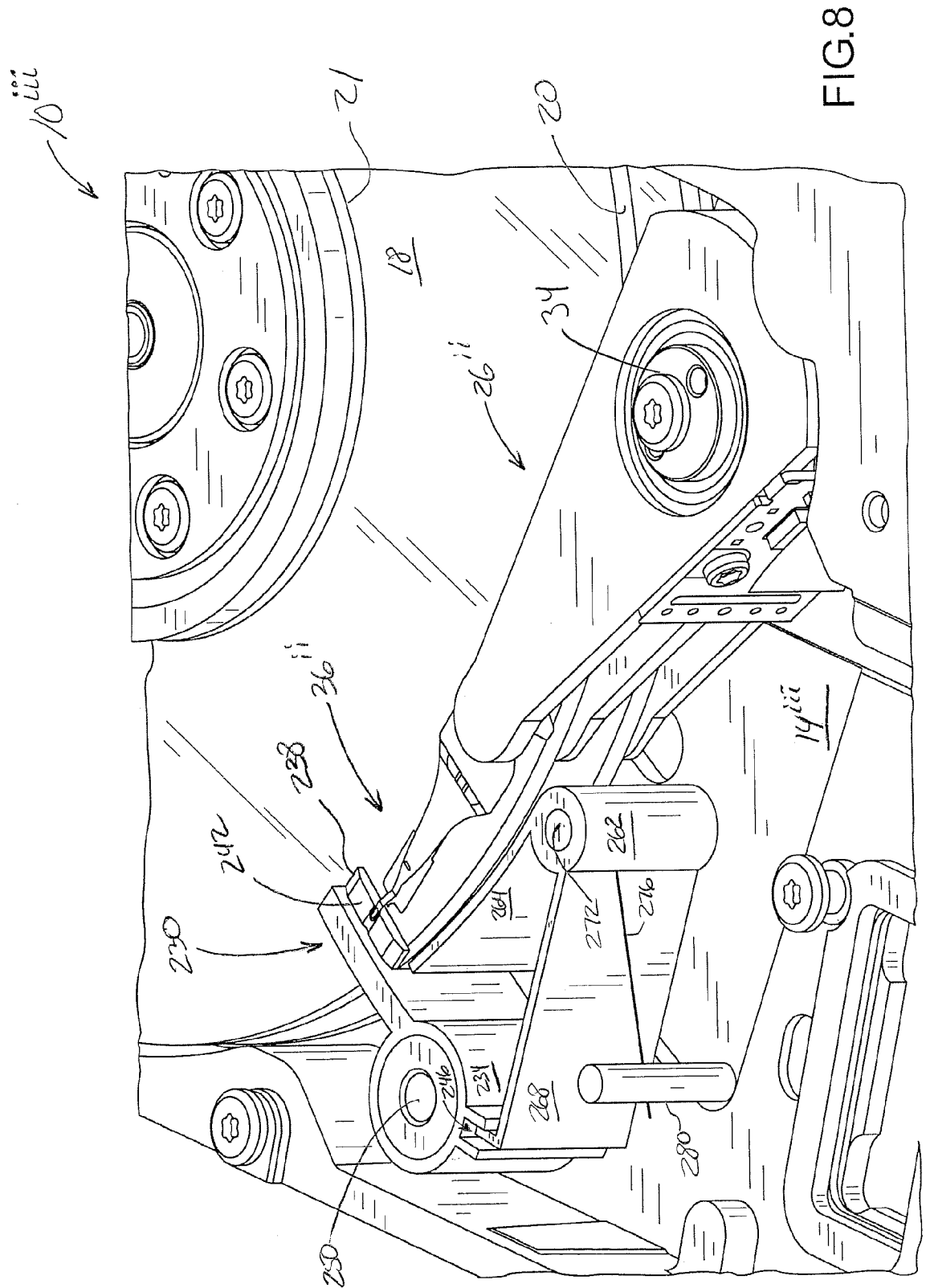
FIG. 8 is a perspective view of another embodiment of an air-actuated load/unload ramp, along with one embodiment of an air-actuated load/unload ramp lock.

FIG. 8 illustrates another embodiment of a disk drive that incorporates two air-actuated components and that is identified by reference numeral 10$^{iii}$. Components of the disk drive 10$^{iii}$ of FIG. 8 that correspond with a component of the disk drive 10 of FIGS. 1-4 are identified by the same reference numeral, and the corresponding discussion presented above remains equally applicable unless otherwise noted. Initially, the disk drive 10$^{iii}$ uses the above-noted head positioner assembly 26$^i$ from the embodiment of FIG. 5. Moreover, the disk drive 10$^{iii}$ uses a dynamic or air-actuated load/unload ramp 230 and a dynamic or air-actuated ramp lock 258. Generally, the ramp lock 258 is air-actuated to unlock the load/unload ramp 230, to in turn accommodate an air-actuated movement of the load/unload ramp 230 from a parked position to an operational position to accommodate normal disk drive operations. Typically the load/unload ramp 230 will move from its parked position to its operational position by air-current forces after the head positioner assembly 26$^i$ has been unloaded from the load/unload ramp 230 for use in normal disk drive operations.

The ramp lock 258 cooperates with a ramp lock groove or locking member 246 on the load/unload ramp 230 to retain the load/unload ramp 230 in its parked position until sufficient air currents are generated by a rotation of one or more data storage disks 18 used by the disk drive 10$^{iii}$. Stated another way, the ramp lock 258 retains the load/unload ramp 230 in its parked position until one or more data storage disks 18 used by the disk drive 10$^i$ reach at least a certain rotational velocity. Each of the ramp lock 258 and the ramp lock groove or locking member 246 of the load/unload ramp 230 may be of any appropriate size, shape, and/or configuration, and further may be disposed at any appropriate location so as to be able to cooperate to lock the load/unload ramp 230 in the parked position until the desired/required time.

Generally, the ramp lock 258 is disposed a suitable distance beyond a perimeter or outer diameter 20 of one or more of the data storage disks 18 (e.g., radially beyond). Although a closely spaced relation may be desirable between the ramp lock 258 and the perimeter 20 of one or more of the data storage disks 18 used by the disk drive 10$^{iii}$, preferably the ramp lock 258 does not come into contact with any of the data storage disks 18 at any time. More specifically, the ramp lock 258 may be characterized as having a body 262 that is mounted on what may be characterized as a pivot 272. Generally, the ramp lock 258 is movable about the pivot 272 in a manner that will be discussed in more detail below (e.g., at least generally about a fixed axis although other motions may be appropriate). The pivot 272 may be in the form of a bearing to accommodate movement of the ramp lock 258 and relative to the base plate 14$^{iii}$, may simply be in the form of a fixed pivot pin or the like, or of any appropriate configuration that allows the ramp lock 258 to move relative to the base plate 14$^{iii}$ between locked and unlocked positions. It may be preferable to realize reduced frictional forces between the ramp lock 258 and its pivot 272.

A biasing member 276 biases the ramp lock 258 into its locking position that maintains the load/unload ramp 230 in its parked position. In the illustrated embodiment, the biasing member 276 is in the form of a hinge spring or the like, having one end that engages an anchor 280 fixed to the base plate 14$^{iii}$, and a second end (not shown) that biases the ramp lock 258 into a position that maintains the load/unload ramp 230 in its parked position. The pivot 272 could in fact be part of the biasing member 276, and where a second leg of the biasing member 276 could extend within or be part of the air flap arm 264 of the ramp lock 258, although such may not be required in all instances. Any appropriate way for biasing the ramp lock 258 into a position that maintains the load/unload ramp 230 in its parked position until the desired/required time may be utilized.

The ramp lock 258 further includes an air flap arm 264 and a locking member 268 that each extend from the above-noted body 262. Each of the air flap arm 264 and the locking member 268 may be of any appropriate size, shape, and/or configuration. In any case, what is desirable is for the air flap arm 264 of the ramp lock 258 to be exposed to air currents generated by a rotation of one or more data storage disks 18 used by the disk drive 10$^{iii}$, and to be moved at least generally away from the perimeter 20 of these data storage disks 18 by the corresponding force to unlock the load/unload ramp 230 at a desired time (e.g., by the ramp lock 258 moving at least generally about the pivot 272 in a direction that will eventually direct the locking member 268 of the ramp lock 258 out of the ramp lock groove 246 of the load/unload ramp 230 to allow the load/unload ramp 230 to move from its parked position to its operational position).

Based upon the foregoing, it should be appreciated that the ramp lock 258 is an air-actuated component of the disk drive 10$^{iii}$. In the illustrated embodiment, the force generated by the air currents from rotation of one or more disks 18 provides the sole force for moving the ramp lock 258 from its locked position to its unlocked position.

The load/unload ramp 230 is air-actuated and is movable between at least two general positions—a parked position for accommodating parking of the head positioner assembly 26$^i$ on the load/unload ramp 230 (FIG. 8), and an operational position (e.g., similar to FIG. 6E) to accommodate normal disk drive operations. Generally, the load/unload ramp 230 includes a body 234, and is movable about the pivot 250 in a manner that will be discussed in more detail below (e.g., at least generally about a fixed axis, although other motions may be appropriate). The pivot 250 may be in the form of a bearing to accommodate movement of the load/unload ramp 230 between its parked and operational positions, may simply be in the form of a fixed pivot pin or the like, or of any appropriate configuration that allows the load/unload ramp 230 to move between its parked and operational positions. The pivot 250 may also incorporate a biasing member of any appropriate type (e.g., a hinge spring) for purposes of biasing the load/unload ramp 230 to its parked position, although such a biasing member may be incorporated in any appropriate manner. Moreover, the load/unload ramp 230 includes one or more surfaces on which an air-actuation force is exerted to move the ramp 230 from its parked position to its operational position. In the illustrated embodiment, the force generated by the air currents from rotation of one or more disks 18 provides the sole force for moving the load/unload ramp 230 from its parked position to its operational position.

The load/unload ramp 230 further includes one or more ramp sections 238 that extend from the body 234. Each ramp section 238 includes an unloading surface 242, and is in accordance with the ramp section 106 discussed above in relation to the FIG. 5 embodiment such that this discussion need not be repeated.

The operation of the dynamic load/unload ramp 230 may be summarized with continued reference to FIG. 8. FIG. 8 illustrates the parked position for the load/unload ramp 230, and where the head positioner assembly $26^i$ is in its parked position on/relative to the load/unload ramp 230. Powering on of the disk drive $10^{iii}$ initiates rotation of each of the data storage disks 18 used by the disk drive $10^{iii}$. The bias of the head positioner assembly $26^i$ discussed above with regard to FIG. 6B may be utilized by the disk drive $10^{iii}$ as desired/required. Powering on the disk drive $10^{iii}$ initiates rotation of each of its data storage disks 18. Typically after the various data storage disks 18 reach a certain rotational speed, the head positioner assembly $26^i$ is moved at least generally in the direction of the inner diameter 21 of the disks 18 to load each of its sliders (e.g., slider 42) onto its corresponding data storage disk 18 (e.g., similar to FIG. 6D). That is, the head positioner assembly $26^i$ is unloaded from or moved off of the load/unload ramp 230. At this time, the load/unload ramp 230 is still in its parked position.

A continued increase in the rotational speed of the various data storage disks 18 used by the disk drive $10^{iii}$ will eventually generate sufficient air current forces (exerted on the air flap arm 264) to move the ramp lock 258 at least about a pivot 272 to move the locking member 268 of the ramp lock 258 out of the ramp lock groove 246 of the load/unload ramp 230. It may be desirable for this unlocking of the load/unload ramp 230 to occur only after the head positioner assembly $26^i$ has been unloaded from the load/unload ramp 230, although such may not be required in all instances.

The load/unload ramp 230 moves to its operational position at least some time after the head positioner assembly $26^i$ has been moved off of the load/unload ramp 230 and after the noted air-actuation of the ramp lock 258. Rotation of one or more data storage disks 18 generates an airflow or air currents that exert a force on the load/unload ramp 230 in a direction that is at least generally away from the rotational axis of the disks 18 or their respective inner diameter 21. Once the data storage disks 18 reach at least a certain rotational speed (usually a higher rotational speed than when the head positioner assembly $26^i$ is unloaded from the load/unload ramp 230), these air currents will exert a sufficient force on the load/unload ramp 230 to begin moving the load/unload ramp 230 at least generally toward its operational position (e.g., similar to FIG. 6E, and which provides the above-noted benefits). In this regard, the disk drive $10^{iii}$ may include a stop (not shown) to establish the operational position for the load/unload ramp 230, although such may not be required in all instances. During a power-down cycle and as the rotational speed of the various data storage disks 18 is continually reduced, the biasing force provided by the biasing member associated with the load/unload ramp 230 (not shown) will move the load/unload ramp 230 from its operational position back to the parked position of FIG. 8 (e.g., the biasing force provided by this biasing member will overcome the forces being exerted on the load/unload ramp 230 by the air currents being generated by rotation of the various data storage disks 18 of the drive $10^{iii}$). Moreover and after the load/unload ramp 230 has reached its parked position, the biasing force provided by the biasing member 276 associated with the ramp lock 258 will move the ramp lock 258 back into a locked engagement with the load/unload ramp 230 (e.g., the biasing force provided by this biasing member 276 will overcome the forces being exerted on the ramp lock 258 by the air currents being generated by rotation of the various data storage disks 18 of the drive $10^{iii}$ so as to dispose the locking member 268 of the ramp lock 258 into locking engagement with the ramp lock groove 246 of the load/unload ramp 230). Thereafter, the head positioner assembly 26 may be parked at least generally in the manner discussed above with regard to the embodiment of FIG. 5.

Figure 9:
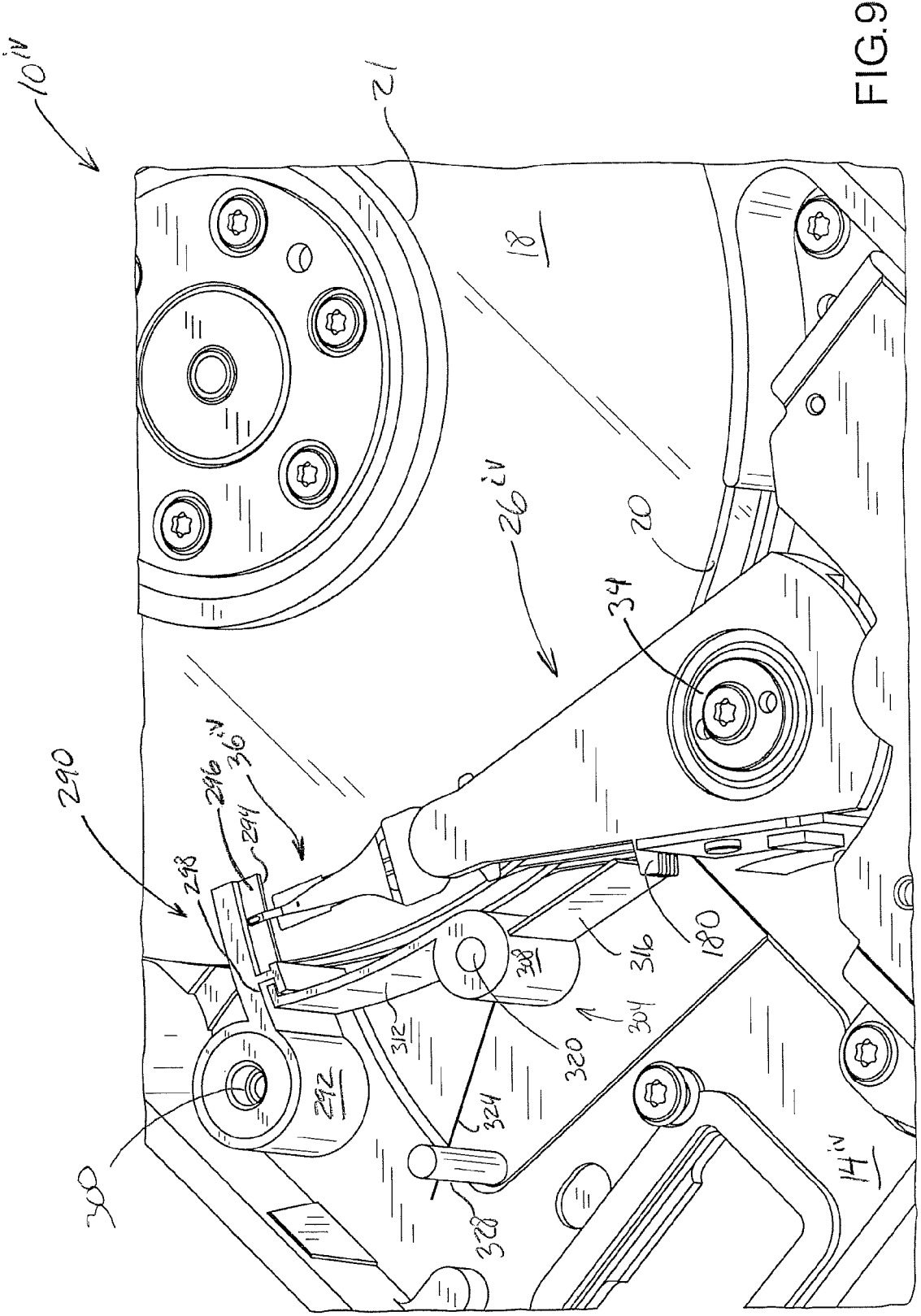
FIG. 9 is a perspective view of another embodiment of an air-actuated load/unload ramp, another embodiment of an air-actuated load/unload ramp lock, and another embodiment of a head positioner assembly lock.

FIG. 9 illustrates another embodiment of a disk drive that incorporates three air-actuated components and that is identified by reference numeral $10^{iv}$. Components of the disk drive $10^{iv}$ of FIG. 9 that correspond with a component of the disk drive 10 of FIGS. 1-4 are identified by the same reference numeral, and the corresponding discussion presented above remains equally applicable unless otherwise noted. Initially, the disk drive $10^{iv}$ uses the above-noted head positioner assembly $26^i$ from the embodiment of FIG. 5. Moreover, the disk drive $10^{iv}$ uses a dynamic or air-actuated load/unload ramp 290 and a dynamic or air-actuated multi-function lock 304 that provides both a ramp locking function and a head positioner assembly locking function. Generally, one portion of the multi-function lock 304 is air-actuated to unlock the head positioner assembly $26^i$ to allow the same to be unloaded from the load/unload ramp 290. Moreover, another portion of the multi-function lock 304 is air-actuated to unlock the load/unload ramp 290, to in turn accommodate an air-actuated movement of the load/unload ramp 290 from a parked position to an operational position for normal disk drive operations.

The multi-function lock 304 may be characterized as having a body 308 that is mounted on what may be characterized as a pivot 320. Generally, the multi-function lock 304 is movable about the pivot 320 in a manner that will be discussed in more detail below (e.g., at leat generally about a fixed axis, although other motions may be appropriate). The pivot 320 may be in the form of a bearing to accommodate movement of the multi-function lock 304 and relative to the base plate $14^{iv}$, may simply be in the form of a fixed pivot pin or the like, or of any appropriate configuration that allows the multi-function lock 304 to move relative to the base plate $14^{iv}$ between at least two general positions. It may be preferable to realize reduced frictional forces between the multi-function lock 304 and its pivot 320.

The multi-function lock 304 includes a ramp lock 312 and an air flap actuator lock 316 that each extend from the body 308 of the multi-function lock 304. However, these locks 312, 316 could be separate structures as well. Generally, the actuator lock 316 is disposed beyond the perimeter of one or more of the data storage disks 18 used by the disk drive $10^i$. The discussion presented above with regard to the locking member 178 of the actuator lock 170 of the FIG. 5 embodiment is at least generally applicable to the actuator lock 316 of this FIG. 9 embodiment. When the head positioner assembly $26^i$ is parked on the load/unload ramp 290, the air flap actuator lock 316 cooperates with the actuator lock tab 180 of the head positioner assembly $26^i$ to retain the head positioner assembly $26^i$ in its parked position on the load/unload ramp 290. The actuator lock 316 remains in the position illustrated in FIG. 9 until sufficient air currents are generated by a rotation of one or more data storage disks 18 used by the disk drive 10$^i$. Once the various disks 18 reach a certain rotational speed, the resulting force is sufficient to move the actuator lock 316 away from the actuator lock tab 180 of the head positioner assembly 26$^i$ (e.g., by a deflection of the actuator lock 316 relative to the body 308, at least generally about a fixed axis (the "anchor" location on the body 308, although other motions may be appropriate), which then allows the head positioner assembly 26$^i$ to move off of or to unload from the ramp 290.

Based upon the foregoing, it should be appreciated that the actuator lock 316 is an air-actuated component of the disk drive 10$^{iv}$. In the illustrated embodiment, the force generated by the air currents from rotation of one or more disks 18 provides the sole force for moving the actuator lock 316 from its locked position to its unlocked position.

The ramp lock 312 of the multi-function lock 304 cooperates with a ramp lock groove 298 on the load/unload ramp 290 to retain the load/unload ramp 290 in its parked position until sufficient air currents are generated by a rotation of one or more data storage disks 18 used by the disk drive 10$^{iv}$. Stated another way, the ramp lock 312 of the multi-function lock 304 retains the load/unload ramp 290 in its parked position until one or more data storage disks 18 used by the disk drive 10$^{iv}$ reach at least a certain rotational velocity. Generally, the ramp lock 312 and the ramp lock groove or locking member 298 of the load/unload ramp 290 each may be of any appropriate size, shape, and/or configuration, and further may be disposed at any appropriate location so as to be able to cooperate to lock the load/unload ramp 290 in the parked position until the desired/required time.

The ramp lock 312 of the multi-function lock 304 is disposed a suitable distance beyond a perimeter or outer diameter 20 of one or more of the data storage disks 18 (e.g., radially beyond). Although a closely spaced relation may be desirable between the ramp lock 312 and the perimeter 20 of one or more of the data storage disks 18 used by the disk drive 10$^{iv}$, preferably the ramp lock 312 does not come into contact any of the data storage disks 18 at any time. More specifically, the ramp lock 312 extends from the body 262 of the multi-function lock 304, which again is mounted on the above-noted pivot 320.

Generally, the ramp lock 312 is movable about the pivot 320 in a manner that will be discussed in more detail below (e.g., at least generally about a fixed axis, although other motions may be appropriate). The pivot 320 may be in the form of a bearing to accommodate movement of the ramp lock 312 and relative to the base plate 14$^{iv}$, may simply be in the form of a fixed pivot pin or the like, or of any appropriate configuration that allows the ramp lock 312 to move relative to the base plate 14$^{iv}$ at least generally between two positions (a locking or locked position and an unlocked position). It may be preferable to realize reduced frictional forces between the ramp lock 312 and its pivot 320.

What is desirable is for the ramp lock 312 to be exposed to air currents generated by a rotation of one or more data storage disks 18 used by the disk drive 10$^{iv}$, and to be moved at least generally away from the perimeter 20 of these data storage disks 18 by the corresponding force to unlock the load/unload ramp 290 at a desired time (e.g., by the ramp lock 312 moving at least generally about pivot 320, and which will eventually direct the ramp lock 312 out of the ramp lock groove 298 of the load/unload ramp 290 to allow the load/unload ramp 290 to move from its parked position to its operational position).

A biasing member 324 biases the ramp lock 312 into its locked position, where it maintains the load/unload ramp 290 in its parked position. In the illustrated embodiment, the biasing member 324 is in the form of a hinge spring or the like, having one end that engages an anchor 328 fixed to the base plate 14$^{iv}$, and another end (not shown) that biases the ramp lock 312 into the position illustrated in FIG. 9. The pivot 320 could in fact be part of the biasing member 324, and where another leg of the biasing member 324 could extend within or be part of the ramp lock 312, although such may not be required in all instances. Any appropriate way for biasing the ramp lock 312 into the position illustrated in FIG. 9 may be utilized.

Based upon the foregoing, it should be appreciated that the ramp lock 312 is an air-actuated component of the disk drive 10$^{iv}$. In the illustrated embodiment, the force generated by the air currents from rotation of one or more disks 18 provides the sole force for moving the ramp lock 312 from its locked position to its unlocked position.

The load/unload ramp 290 is air-actuated and is movable between at least two general positions—a parked position for accommodating parking of the head positioner assembly 26$^i$ on the load/unload ramp 290, and an operational position to accommodate normal disk drive operations. Generally, the load/unload ramp 290 includes a body 292, and is movable about the pivot 300 in a manner that will be discussed in more detail below (e.g., at least generally about a fixed axis, although other motions may be appropriate). The pivot 300 may be in the form of a bearing to accommodate movement of the load/unload ramp 290 between its parked and operational positions, may simply be in the form of a fixed pivot pin or the like, or of any appropriate configuration that allows the load/unload ramp 290 to move between its parked and operational positions. The pivot 300 may also incorporate a biasing member of any appropriate type (e.g., a hinge spring) for purposes of biasing the load/unload ramp 290 into its parked position, although such a biasing member may be incorporated in any appropriate manner. Moreover, the load/unload ramp 290 includes one or more surfaces on which an air-actuation force is exerted to move the ramp 290 from its parked position to its operational position. In the illustrated embodiment, the force generated by the air currents from rotation of one or more disks 18 provides the sole force for moving the load/unload ramp 290 from its locked position to its unlocked position.

The load/unload ramp 290 further includes one or more ramp sections 294 that extend from the body 292. Each ramp section 294 includes an unloading surface 296, and is in accordance with the ramp section 106 discussed above in relation to the FIG. 5 embodiment such that this discussion need not be repeated.

The operation of the various air-actuated components of the disk drive 10$^{iv}$ may be summarized with continued reference to FIG. 9. FIG. 9 illustrates the parked position for the load/unload ramp 290, and where the head positioner assembly 26$^i$ is in its parked position on/relative to the load/unload ramp 290. Powering on the disk drive 10$^{iv}$ initiates rotation of each of the data storage disks 18 used by the disk drive 10$^{iv}$. The bias of the head positioned assembly 26$^i$ discussed above with regard to FIG. 6B may be utilized by the disk drive 10$^{iv}$ as desired/required. Powering on the disk drive 10$^{iv}$ initiates rotation of each of its data storage disks 18. After the various data storage disks 18 reach a certain rotational speed, the force corresponding with the air currents generated by this rotation will be sufficient to move the air flap actuator lock 316 relative to the body 308 of the multi-function lock 304 and at least generally away from the head positioner assembly 26$^i$. In the illustrated embodiment, this occurs by a flexing of the actuator lock 316 relative to its anchor location to the body 308. However, any way of realizing this motion for the actuator lock 316 may be utilized. In any case, this will then dispose the air flap actuator lock 316 out of locking engagement with the actuator lock tab 180 of the head positioner assembly 26$^i$. Thereafter, the head positioner assembly 26$^i$ may be moved at least generally toward the inner diameter 21 of the various disks 18 to load each of its sliders (e.g., slider 42) onto its corresponding data storage disk 18 (e.g., similar to FIG. 6D). That is, the head positioner assembly 26$^i$ is unloaded from or moved off 15 of the load/unload ramp 290. At this time, the load/unload ramp 290 is still in its parked position.

A continued increase in the rotational speed of the various data storage disks 18 used by the disk drive 10$^{iv}$ will eventually generate sufficient air current forces (exerted on the ramp lock 312) to move the ramp lock 312 at least generally about the pivot 320 to move the ramp lock 312 out of the ramp lock groove 298 on the load/unload ramp 290. It may be desirable for this unlocking of the load/unload ramp 290 to occur only after the head positioner assembly 26$^i$ has been unloaded from the load/unload ramp 290, although such may not be required in all instances.

The load/unload ramp 290 moves to its operational position at least some time after the head positioner assembly 26$^i$ has been moved off of the load/unload ramp 290. Rotation of one or more data storage disks 18 generates an airflow or air currents that exert a force on the load/unload ramp 290 in a direction that is at least generally away from the rotational axis of the disks 18 or at least generally way from their respective inner diameter 21. Once the data storage disks 18 reach at least a certain rotational speed (usually a higher rotational speed than when the head positioner assembly 26$^i$ is unloaded from the load/unload ramp 290), these air currents will exert a sufficient force on the load/unload ramp 290 to begin moving the load/unload ramp 290 at least generally about its pivot 300 to its operational position (e.g., similar to FIG. 6E, and which provides the above-noted benefits). In this regard, the disk drive 10$^{iv}$ may include a stop (not shown) to establish the operational position for the load/unload ramp 290, although such may not be required in all instances.

During a power-down cycle and as the rotational speed of the various data storage disks 18 is continually reduced, the biasing force provided by the biasing member associated with the load/unload ramp 290 (not shown) will move the load/unload ramp 290 from its operational position (e.g., FIG. 6E) back to the parked position of FIG. 9 (e.g., the biasing force provided by this ramp biasing member will overcome the forces being exerted on the load/unload ramp 290 by the air currents being generated by rotation of the various data storage disks 18 of the drive 10$^{iv}$). Moreover and after the load/unload ramp 290 has assumed its parked position, the biasing force provided by the biasing member 324 associated with the ramp lock 312 will move the ramp lock 312 back into a locking engagement with the load/unload ramp 290 (e.g., the biasing force provided by this biasing member 324 will overcome the forces being exerted on the ramp lock 312 by the air currents being generated by rotation of the various data storage disks 18 of the drive 10$^{iv}$ so as to dispose the ramp lock 312 into locking engagement with the ramp lock groove 298 of the load/unload ramp 290). Thereafter, the head positioner assembly 26$^i$ may be parked at least generally in the manner discussed above with regard to the embodiment of FIG. 5. Continued reduction of the rotational speed of the various disks 18 will then allow the air flap actuator lock 316 to move relative to the body 308 of the multi-function lock 304 into position so as to be able to cooperate with the actuator lock tab 180 of the head positioner assembly 26$^i$ to lock the head positioner assembly 26$^i$ in its locked position on the load/unload ramp 290.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive, comprising:
   a first data storage disk;
   a first locking member movable relative to said first data storage disk and disposed beyond an outer perimeter of said first data storage disk;
   a head positioner assembly movable relative to said first data storage disk, wherein said head positioner assembly comprises a second locking member, and wherein engagement of said first locking member with said second locking member restrains inwardly directed movement of said head positioner assembly relative to said first data storage disk; and
   a load/unload ramp movable relative to said first data storage disk, wherein said load/unload ramp is air-actuated to move from a first position to a second position, and wherein said load/unload ramp is in said first position when said head positioner assembly is parked using said load/unload ramp.

2. The disk drive of claim 1, wherein said load/unload ramp is vertically aligned with said first data storage disk when in each of said first and second positions.

3. The disk drive of claim 2, wherein a distal end of said load/unload ramp is disposed more inwardly relative to said first data storage disk when load/unload ramp is in said first position versus said second position.

4. The disk drive of claim 1, further comprising a first biasing member that biases said load/unload ramp toward said first position.

5. The disk drive of claim 1, wherein air currents associated with a rotation of said first data storage disk move said first locking member away from said second locking member to unlock said head positioner assembly.

6. The disk drive of claim 1, further comprising a cam movable relative to said first data storage disk and disposed beyond an outer perimeter of said first data storage disk, wherein said disk drive further comprises a cam follower on said load/unload ramp, wherein said cam interfaces with said cam follower to move said load/unload ramp at least from said first position to said second position.

7. The disk drive of claim 6, further comprising a first biasing member engaged with said cam and that biases said cam to dispose said load/unload ramp in said first position.

8. The disk drive of claim 6, further comprising a first locking member movable relative to said first data storage disk and disposed beyond said outer perimeter of said first data storage disk, wherein said head positioner assembly comprises a second locking member, wherein engagement of said first locking member with said second locking member restrains inwardly directed movement of said head positioner assembly relative to said first data storage disk.

9. The disk drive of claim 8, wherein said cam is aligned with and disposed beyond said first locking member suck that said first locking member is located between said cam and said outer perimeter of said first data storage disk.

10. The disk drive of claim 8, wherein air currents associated with a rotation of said first data storage disk move said first locking member away from said second locking member to unlock said head positioner assembly and also move said cam to in turn move said load/unload ramp from said first position to said second position.

11. The disk drive of claim 6, wherein air currents associated with a rotation of said first data storage disk moves said cam to in turn move said load/unload ramp from said first position to said second position.

12. The disk drive of claim 1, further comprising an arm that is disposed beyond a perimeter of said first data storage disk, wherein said load/unload ramp is fixed relative to and extends from said arm, and wherein air currents associated with a rotation of said first data storage disk move said arm to in turn move said load/unload ramp from said first position to said second position.

13. The disk drive of claim 1, wherein air currents associated with a rotation of said first data storage disk act directly on said load/unload ramp to move said load/unload ramp from said first position to said second position.

14. A disk drive, comprising:
a first data storage disk;
a head positioner assembly movable relative to said first data storage disk;
a load/unload ramp movable relative to said first data storage disk, wherein said load/unload ramp is air-actuated to move from a first position to a second position, and wherein said load/unload ramp is in said first position when said head positioner assembly is parked using said load/unload ramp; and
a load/unload ramp locking member movable relative to said first data storage disk and engageable with said load/unload ramp to retain said load/unload ramp in said first position.

15. The disk drive of claim 14, wherein air currents associated with rotation of said first data storage disk move said load/unload ramp locking member out of engagement with said load/unload ramp to allow said load/ramp to move from said first position to said second position.

16. The disk drive of claim 14, further comprising a first biasing member engaged with said load/unload ramp locking member and that biases said load/unload ramp locking member into a locking engagement with said load/unload ramp.

17. The disk drive of claim 14, further comprising a first locking member movable relative to said first data storage disk and disposed beyond an outer diameter of said first data storage disk, wherein said head positioner assembly comprises a second locking member, wherein engagement of said first locking member with said second locking member restrains inwardly directed movement of said head positioner assembly relative to said first data storage disk.

18. The disk drive of claim 17, wherein said load/unload ramp locking member and said first locking member extend from a common structure.

* * * * *